(12) United States Patent
Marinaro et al.

(10) Patent No.: US 12,101,362 B2
(45) Date of Patent: Sep. 24, 2024

(54) DYNAMIC PROVISIONING FOR MULTIPARTY CONVERSATIONS ACROSS SERVICE DELIVERY NETWORKS ON A SINGLE COMMUNICATION CHANNEL

(71) Applicant: M3G Technology, Inc., San Francisco, CA (US)

(72) Inventors: Douglas Edward Marinaro, Santa Clara, CA (US); Aviraj B. Singh, Brooklyn, NY (US); Patrick John Banta, San Rafael, CA (US)

(73) Assignee: M3G Technology, Inc., San Francisco, CA (US)

( * ) Notice: Subject to any disclaimer, the term of this patent is extended or adjusted under 35 U.S.C. 154(b) by 0 days.

(21) Appl. No.: 18/239,181

(22) Filed: Aug. 29, 2023

(65) Prior Publication Data

US 2024/0073261 A1    Feb. 29, 2024

Related U.S. Application Data

(60) Provisional application No. 63/402,252, filed on Aug. 30, 2022.

(51) Int. Cl.
*H04L 65/403*    (2022.01)
*H04L 67/146*    (2022.01)

(52) U.S. Cl.
CPC .......... *H04L 65/403* (2013.01); *H04L 67/146* (2013.01)

(58) Field of Classification Search
CPC ............................ H04L 65/403; H04L 67/146
(Continued)

(56) References Cited

U.S. PATENT DOCUMENTS 10,916,251 B1 *    2/2021    Brandt ................... G06Q 40/03
2010/0064017 A1 *    3/2010    Buchheit ............... H04L 51/216
                                                            709/206
(Continued)

FOREIGN PATENT DOCUMENTS

CN    115941213 A    *    4/2023

OTHER PUBLICATIONS

AppClose, How do I add a third party?, Sep. 3, 2019, https://support.appclose.com/hc/en-us/articles/360022698313-How-do-I-add-a-third-party (Year: 2019).*

(Continued)

*Primary Examiner* — Zi Ye
(74) *Attorney, Agent, or Firm* — Georgiy L. Khayet

(57) ABSTRACT

A method for establishing at least three-way conversation between a primary party, secondary parties, and one or more brand agents within an SDN is provided. The method includes initiating a two-way communication channel between a first communication endpoint associated with the primary party and a second communication endpoint assigned to the one or more brand agents. The method then proceeds with receiving a selection of one or more secondary parties from a database. The method includes synthesizing a Uniform Resource Locator (URL) for a secondary party of the one or more secondary parties to join the two-way communication channel and providing the URL to a third communication endpoint associated with the secondary party. The method includes initiating, upon detecting that the secondary party clicked the URL, the at least three-way conversation between the primary party, the secondary party, and the one or more brand agents via the two-way communication channel.

20 Claims, 28 Drawing Sheets

(58) Field of Classification Search
USPC .......................................................... 709/204
See application file for complete search history.

(56) References Cited

U.S. PATENT DOCUMENTS

| | | |
|---|---|---|
| 2014/0055553 A1 | 2/2014 | Lee et al. |
| 2015/0341289 A1 | 11/2015 | Malik |
| 2016/0087925 A1* | 3/2016 | Kalavagattu .......... H04L 51/066 709/206 |
| 2020/0388402 A1* | 12/2020 | Frey ...................... H04L 51/222 |
| 2021/0144106 A1* | 5/2021 | Chen ....................... G06F 40/35 |

OTHER PUBLICATIONS

Mastermojo, Announce the user's name who's joined the voice channel you're in, Feb. 27, 2019, https://support.discord.com/hc/en-us/community/posts/360042592972-Announce-the-user-s-name-who-s-joined-the-voice-channel-you-re-in (Year: 2019).*

GoogleSupport, How to change back from SMS to RCS?, Apr. 13, 2021, https://support.google.com/messages/thread/106080255/how-to-change-back-from-sms-to-rcs?hl=en (Year: 2021).*

Whitney, Find My Friends: How to Share Your Location With Others on iPhone, Oct. 29, 2021, https://www.pcmag.com/how-to/find-my-friends-how-to-share-your-location-with-others-on-iphone (Year: 2021).*

Mehvish, 5 Best Ways to Export WhatsApp Chat to PDF, May 16, 2022, https://techwiser.com/ways-to-export-whatsapp-chat-to-pdf/ (Year: 2022).*

* cited by examiner

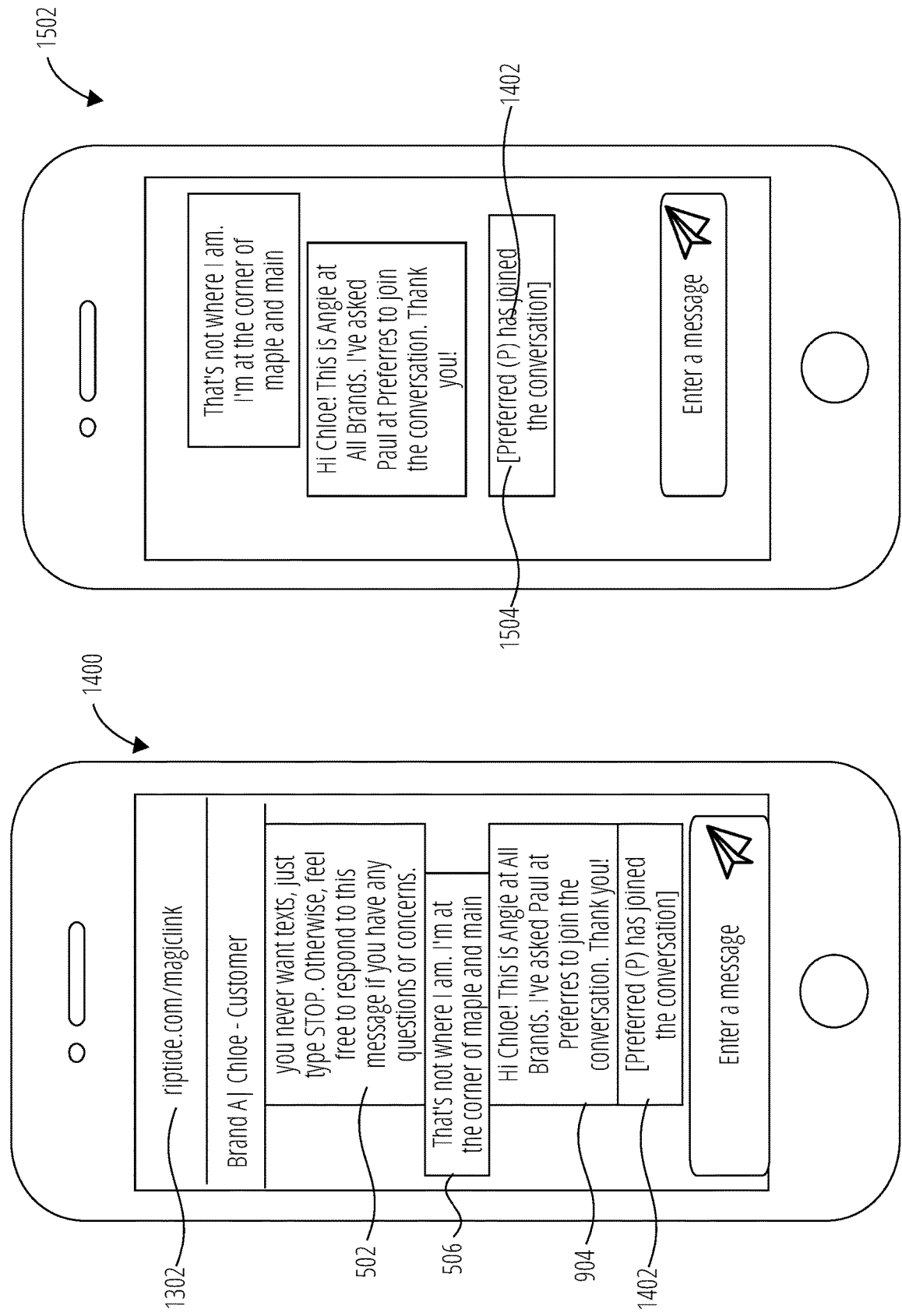

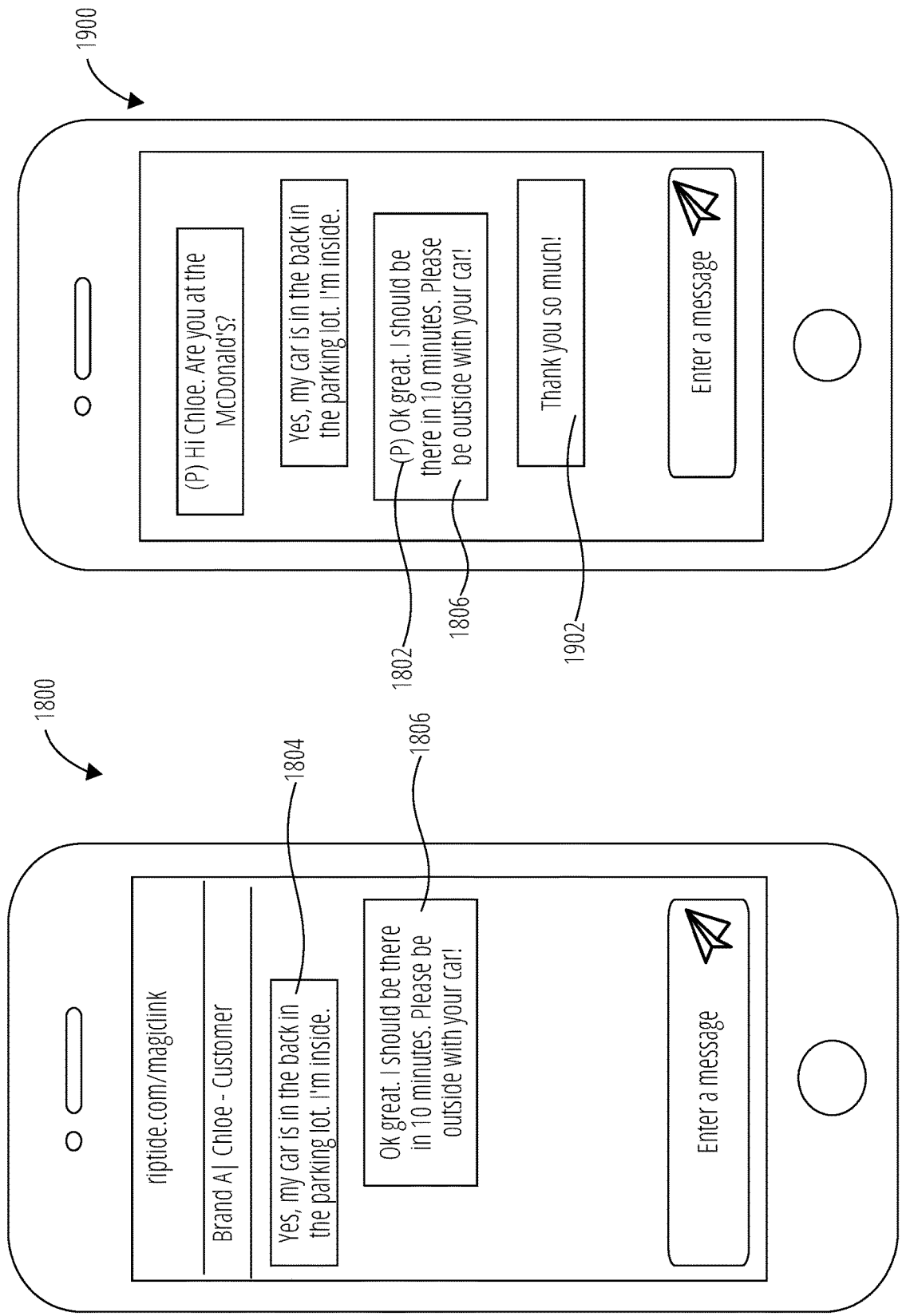

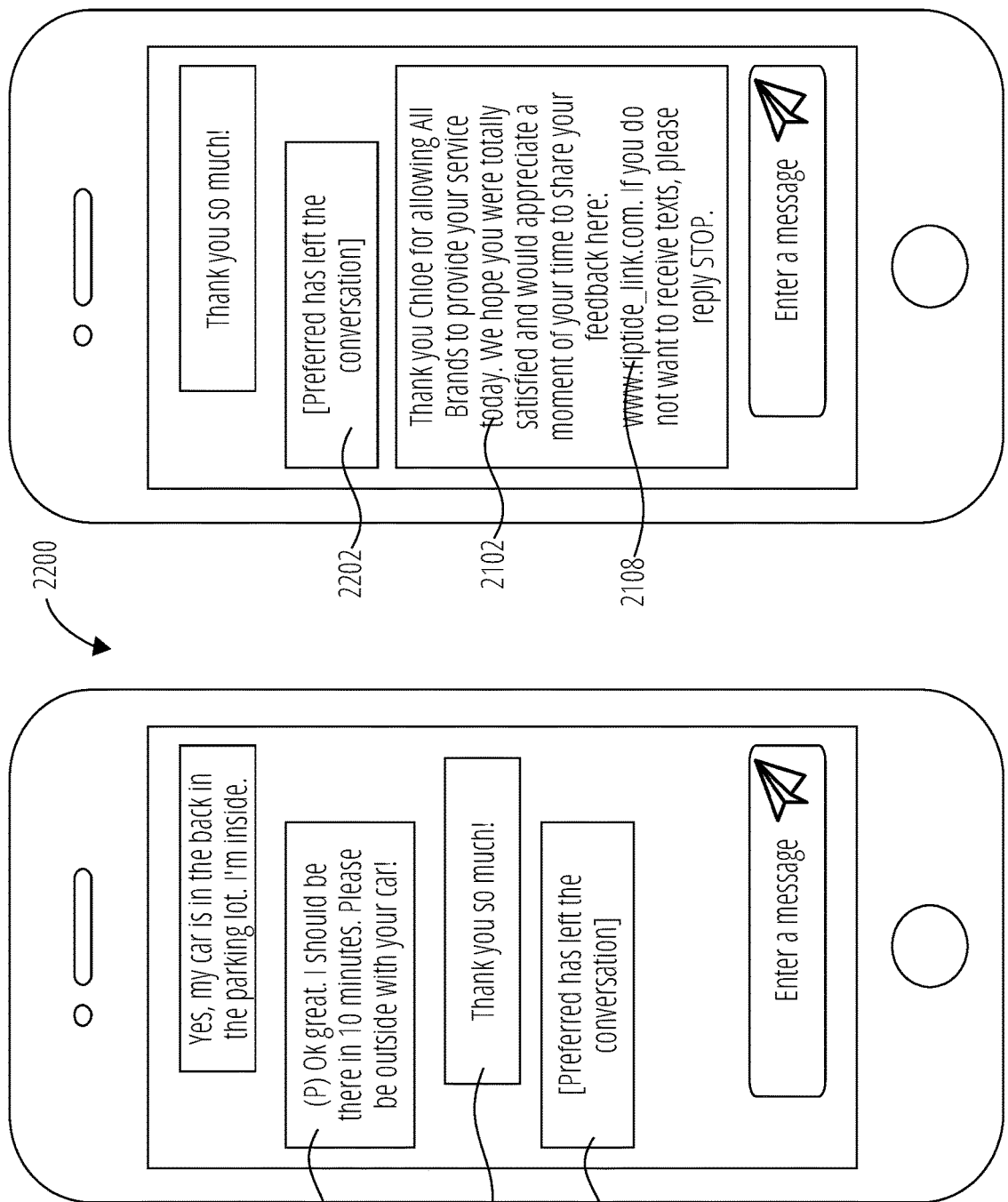

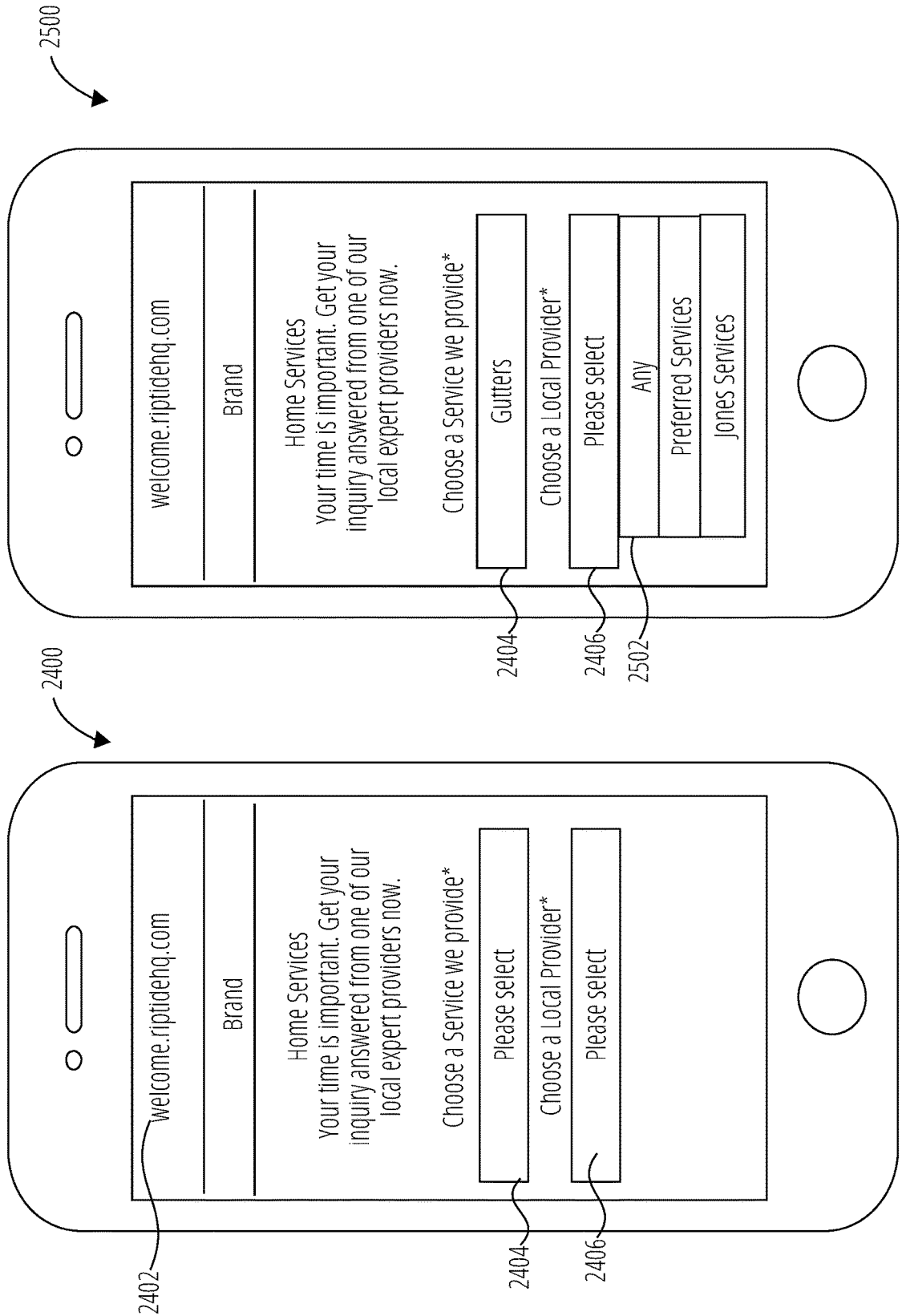

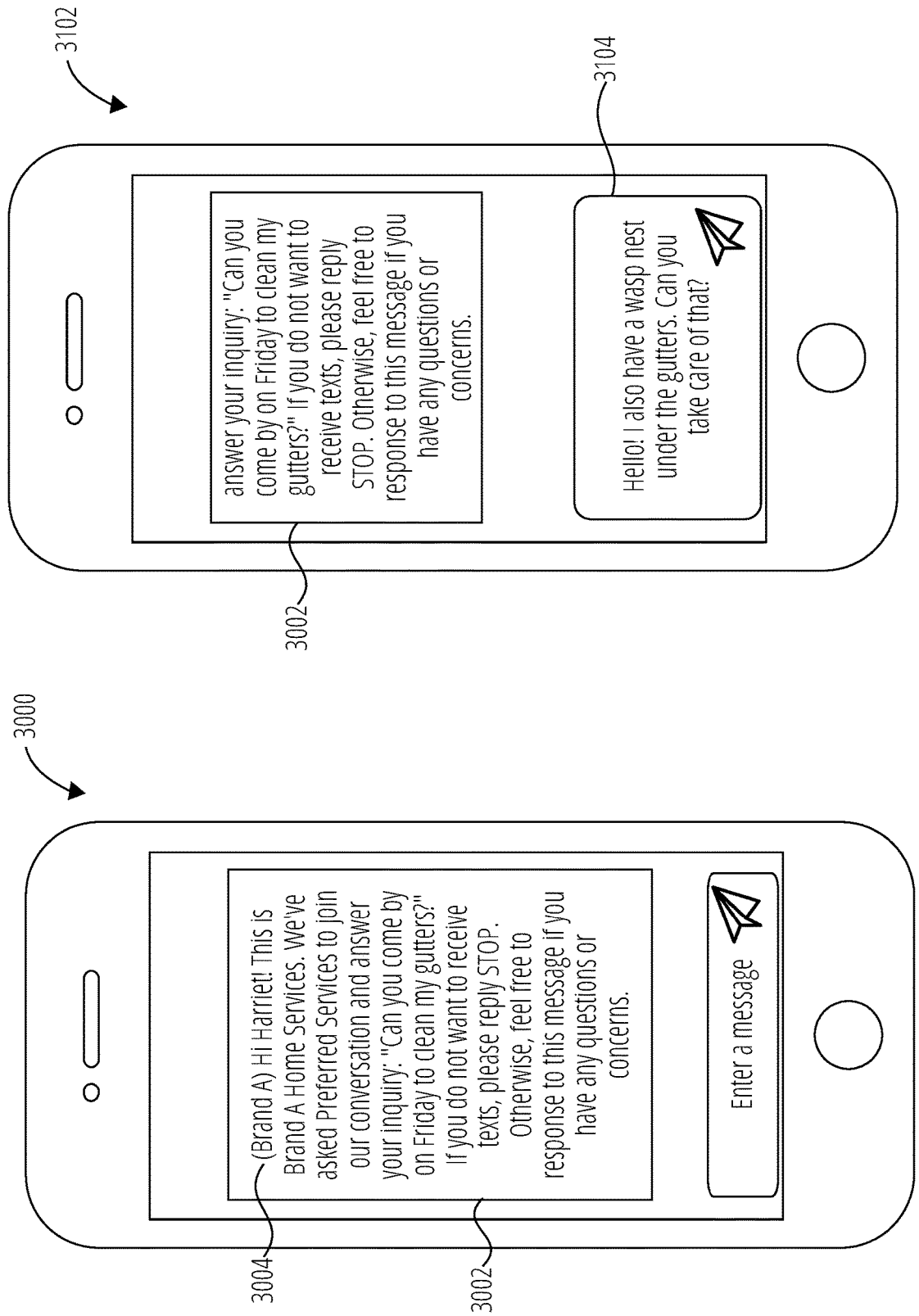

DYNAMIC PROVISIONING FOR MULTIPARTY CONVERSATIONS ACROSS SERVICE DELIVERY NETWORKS ON A SINGLE COMMUNICATION CHANNEL

CROSS-REFERENCE TO RELATED APPLICATIONS

The present application claims priority of U.S. Provisional Patent Application No. 63/402,252 filed on Aug. 30, 2022, entitled "DYNAMIC PROVISIONING FOR MULTIPARTY CONVERSATIONS ACROSS SERVICE DELIVERY NETWORKS ON A SINGLE COMMUNICATION CHANNEL," which is incorporated herein by reference in its entirety for all purposes.

TECHNICAL FIELD

The present disclosure generally relates to systems and methods for establishing at least three-way conversation between customers, brands, and providers within a service delivery network (SDN).

BACKGROUND

Businesses and other organizations that provide services, such as nonprofit organizations and government agencies, often rely on conversations with their customers before, during, and after the service delivery to ensure the services they provide are delivered correctly and to the customer's satisfaction. The trend of having these conversations online rather than in person has accelerated dramatically in recent times due to the pandemic, changes in work environment, and changes in consumer behavior. Customers expect to engage their service provider through an instant messaging channel at any time instead of adding a new application with a new account.

Businesses may cooperate with other businesses to provide products or services to a set of customers. This cooperation may be informal relationships such as a local auto repair shop cooperating with a local auto body shop and referring customers to each other. This cooperation may also be formal such as an online marketplace business where customers who visit a website of the online marketplace business can search, select, and book appointments at thousands of auto repair shops or an on-demand delivery service business where customer orders placed with hundreds of merchants are delivered by thousands of independent gig workers.

The experience from a customer's perspective is termed an SDN and defined as when two or more organizations, in the customer's eyes, are responsible for the provision of a connected overall service experience (Tax, S et al. "The Service Delivery Network (SDN) A Customer-Centric Perspective of the Customer Journey," October 2013, J. Ser. Res. 16(4):454-470).

This organization of businesses may also be described as a business ecosystem. A business ecosystem is a purposeful arrangement between two or more entities (the members) to create and share value for a collective set of customers.

Typically, one of the two or more organizations that are responsible for the delivery of products or services to an individual or business is viewed by the customer or the other organizations as leading or orchestrating. In business ecosystems, this role is termed the orchestrator and, in this disclosure, referred to as a brand. The employees or authorized contractors within the brand are referred to as agents or brand agents. The other organizations that are orchestrated or lead by the brand and are responsible for the delivery of the product or service are referred to as providers or service providers, and individuals or businesses that receive a product or service are referred to as customers. Collectively, the brand and the providers that the brand orchestrates to deliver products or services to customers is referred to as the SDN.

When two or more organizations are responsible for delivery of the service to an individual or business, breakdowns in communications can occur that may result in delays or improper delivery of the product or service leading to lost opportunity, customer dissatisfaction, lost business, and additional costs. It can be difficult for the brand to ensure that all providers communicate consistently with their customers during the product or service delivery experience. The customer may initially communicate with the brand or brand's systems, which must hand-off communication to the one or more providers who often must communicate directly with the customer to deliver the product or service.

Many customers prefer to communicate via widely used instant messaging communication channels, such as Short Message Service (SMS) and Multimedia Messaging Service (MMS) text messages. While existing business group text messaging enables all the employees or authorized contractors within one business entity to communicate as a group with a single customer in one conversation over a single shared communication channel, it does not provide a method or process for other businesses to join the same conversation and engage with the same customer over the single shared communication channel.

Moreover, for the brand orchestrating an SDN with a large and ever-changing ecosystem of providers, having each of the providers install an application associated with the brand on their user devices can be unrealistic. Instead, an ad hoc method or process of enabling a provider to join the conversation is needed.

Furthermore, when a single communication channel is used for communication exchange between multiple parties, it may be unclear which party is currently communicating with the customer and what the status of provisioning of the service is. Moreover, the customer may not know whether all participants are still participating or whether some of them have left the conversation. Additionally, the customer may want to receive the service from two or more providers and may need to communicate with each of the providers separately without adding all the providers into a group chat. Additionally, the customer may want to communicate with many providers simultaneously to compare the conditions of service provisioned by different providers or to assign different parts of the service to different providers. However, conventional SDNs do not provide the customer with the ability to communicate with a plurality of providers via a single communication channel. Due to these disadvantages, the customer may be dissatisfied with the quality of the service provided by conventional SDNs.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

According to one example embodiment of the present disclosure, a system for establishing at least three-way conversation between a primary party, secondary parties, and one or more brand agents within an SDN is provided. The primary party may include an individual and the secondary parties may include a plurality of further individuals, such as other individuals or teams of individuals. The system may include a processor and a memory storing instructions to be executed by the processor. The processor may be configured to initiate a two-way communication channel between a first communication endpoint associated with the primary party and a second communication endpoint assigned to the one or more brand agents. The one or more brand agents may be associated with a brand and the secondary parties may include entities independent from the brand. The processor may be further configured to receive, from the one or more brand agents and upon the initiating the two-way communication channel, a selection of one or more secondary parties from a database of the secondary parties. The processor may be further configured to synthesize a Uniform Resource Locator (URL) for a secondary party of the one or more secondary parties to join the two-way communication channel. The processor may be further configured to provide the URL to a third communication endpoint associated with the secondary party. The third communication endpoint may be used by the secondary party to join the two-way communication channel. The third communication endpoint associated with the secondary party may be different from the second communication endpoint assigned to the one or more brand agents. The processor may be further configured to initiate, upon detecting that the secondary party clicked the URL, the at least three-way conversation between the primary party, the secondary party, and the one or more brand agents via the two-way communication channel.

According to one example embodiment of the present disclosure, a method for establishing at least three-way conversation between a primary party, secondary parties, and one or more brand agents within an SDN is provided. The primary party may include an individual and the secondary parties may include a plurality of further individuals. The method may commence with initiating a two-way communication channel between a first communication endpoint associated with the primary party and a second communication endpoint assigned to the one or more brand agents. The one or more brand agents may be associated with a brand and the secondary parties may include entities independent from the brand. The method may proceed with receiving, from the one or more brand agents and upon the initiating the two-way communication channel, a selection of one or more secondary parties from a database of the secondary parties. The method may include synthesizing a URL for a secondary party of the one or more secondary parties to join the two-way communication channel. The method may proceed with providing the URL to a third communication endpoint associated with the secondary party. The third communication endpoint may be used by the secondary party to join the two-way communication channel. The third communication endpoint associated with the secondary party may be different from the second communication endpoint assigned to the one or more brand agents. The method may include initiating, upon detecting that the secondary party clicked the URL, the at least three-way conversation between the primary party, the secondary party, and the one or more brand agents via the two-way communication channel.

According to yet another example embodiment of the present disclosure, the operations of the above-mentioned method are stored on a machine-readable medium that includes instructions, which, when implemented by one or more processors, perform the recited operations.

Other example embodiments of the disclosure and aspects will become apparent from the following description taken in conjunction with the following drawings.

BRIEF DESCRIPTION OF DRAWINGS

Exemplary embodiments are illustrated by way of example and not limitation in the figures of the accompanying drawings, in which like references indicate similar elements.

FIG. 14 illustrates a user interface displayed to a provider upon opening a link by the provider, according to an example embodiment.

FIG. 15 illustrates a user interface displayed to a customer upon opening a link and joining a conversation by a provider, according to an example embodiment.

FIG. 18 illustrates a user interface displayed to a provider upon receiving a message from a customer by the provider, according to an example embodiment.

FIG. 19 illustrates a user interface displayed to a customer upon receiving a message from a provider by the customer, according to an example embodiment.

FIG. 22 is a user interface shown to a customer upon closing a conversation by a network representative, according to an example embodiment.

FIG. 23 is a user interface shown to a customer upon closing a conversation by a network representative, according to an example embodiment.

FIG. 24 is a user interface illustrating use of a system in a shopping scenario, according to an example embodiment.

FIG. 25 is a user interface illustrating selection of a provider by a customer, according to an example embodiment.

FIG. 30 shows a user interface displayed on a user device of a customer, according to an example embodiment.

FIG. 31 shows the user interface used by a customer for sending messages, according to an example embodiment.

DETAILED DESCRIPTION

Figure 1:
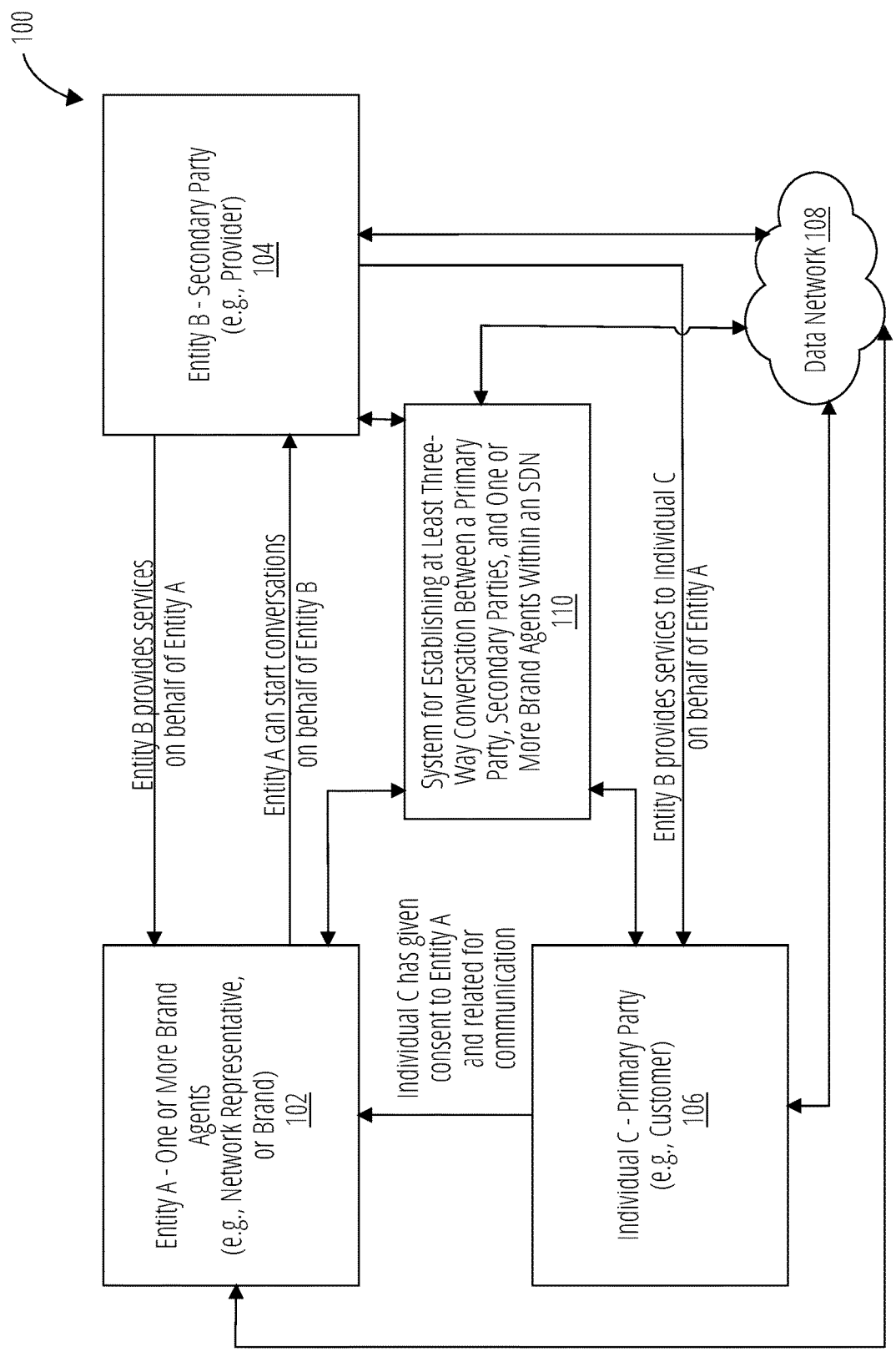
FIG. 1 shows an example environment suitable for practicing systems and methods for establishing at least three-way conversation between a primary party, secondary parties, and one or more brand agents within an SDN, according to an example embodiment.

The following detailed description of embodiments includes references to the accompanying drawings, which form a part of the detailed description. Approaches described in this section are not prior art to the claims and are not admitted to be prior art by inclusion in this section. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and operational changes can be made without departing from the scope of what is claimed. The following detailed description is, therefore, not to be taken in a limiting sense, and the scope is defined by the appended claims and their equivalents.

The present disclosure relates to systems and methods for establishing at least three-way conversation between a primary party, secondary parties, and one or more brand agents within an SDN. The system and methods provide multiparty conversations across SDNs on a single communication channel. The system for establishing at least three-way conversation between a primary party, secondary parties, and one or more brand agents within an SDN is also referred to herein as an SDN conversation system, or a system. Organizations orchestrating SDNs, also referred herein to as brands, may adopt the SDN conversation system by using an Application Programming Interface (API) associated with the SDN conversation system. This automated provisioning of the SDN conversation system may help the brand to define, initiate, manage, store, and analyze conversations and conversational workflows between the brand, a service provider (also referred to as a provider), and a customer; between the brand and the provider; between the brand and the customer; or between the provider and the customer in the SDN via a simple plug-in process or automated provisioning.

A brand may include an independent entity engaged in providing products and services to customers, a business entity engaged in providing products or services, or an organization engaged in activities requiring individuals' interactions. The brand may be represented by an associate of the brand, one or more brand agents, brand employees, bots, and the like. In an example embodiment, a brand may include a third-party aggregator of service providers providing service on behalf of other brands. A customer may include an individual or business that procures services or products from the brand or an individual or business interacting with the brand. A provider may include an independent entity or a business entity engaged in delivering or providing services to customers on behalf of a brand or another business entity partnering with the brand to offer services and products to a customer or an independent business entity.

A network of service providers of the brand can encompass thousands of individual businesses ranging from single person businesses to large organizations. By standardizing conversational customer engagement across the SDN with the system of the present disclosure, brands can significantly improve managing communications between customers and service providers and, hence, improve customer satisfaction.

In an example embodiment, all data associated with the conversations, the customer, and the service provider may be collected and stored for future use and analysis. The collected data can be analyzed based on predetermined criteria. For example, the collected data can be analyzed for response time of a specific service provider, number of services provided by specific service providers, and so forth.

In an example embodiment, the brand may be enabled to plug an API associated with the system of the present disclosure into a Customer Relationship Management system of the brand to define, initiate, manage, store, and analyze conversations and conversational workflows for providers to deliver services to customers.

According to another embodiment, the brand can plug in the system of the present disclosure into the brand's ticketing system. The brand may upload a list of providers, including contact information of the providers and set rules for conversations of providers with the customers. In other embodiments, the system of the present disclosure may help the brand to manage the conversations between a customer, a brand, and a provider, with automatic initiation of conversations between the provider and the customer once the brand receives a request for the service. Neither the provider nor the customer needs to download additional applications or log in to avail themselves of the services. The conversations may be performed via messaging, such as text messaging. Moreover, once the brand receives a request from a customer, the system may automatically initiate a conversation with the provider via instant messaging. The brand can set the rules for such conversations. The brand may oversee the conversations or even actively participate in these conversations.

According to another example embodiment, the system of the present disclosure may be used across a network of providers without having such providers adopt the system. In another embodiment, the system may initiate conversations on demand for providers, in which a provider may receive an instant message from a brand prompting the provider to join a conversation with the customer. If the provider accepts the request for service, the provider is automatically provisioned into the system and can participate in the conversation with the customer, allowing the provider to instantly connect with the customer and start services.

As used herein, a message within the system may include a message from a customer, a provider, or a brand sent via various communication channels such as SMS or MMS text messaging into the SDN. The system may be configured to construct a human-readable message based on the input parameters and synthesize input parameters for a custom message definition based on data, algorithms, or models from multiple sources including the brand, the provider, the customer, historical information, or conversational data.

The system of the present disclosure may be configured to act as a conversation starter between a brand agent (also referred herein to as a network representative), a provider, and a customer. Specifically, the system of the present disclosure enables the network representative to select and add a provider to an existing conversation between the network representative and the customer or drop the provider from the existing three-way conversation. Moreover, the system of the present disclosure enables each participant of the conversation to see who is sending a message and be notified that a three-way conversation has started. Therefore, the system of the present disclosure can allow the network representatives to simultaneously manage communications with consumers and providers.

Moreover, the system of the present disclosure enables a brand agent in a conversation over a two-way communication channel with the primary party to decide to add a secondary party to the conversation. Upon receiving a request from the brand agent to add the secondary party, the system synthesizes a URL that is then sent by the brand agent to the secondary party to join the conversation. The addition of the secondary party to the conversation is performed dynamically, where the brand agent decides to add the secondary party to the conversation and then has the ability to add the secondary party to the conversation.

To provide responsiveness, escalation, and event handling, the system of the present disclosure may have a plurality of business rules to manage multiparty conversations and perform event handling. Specifically, the system may receive a set of business rules for managing a multiparty conversation across an SDN. Upon receiving the set of business rules, the system may ascertain events associated with the multiparty conversation. In response to the ascertained events, the system may take actions based on the set of business rules. The business rules may include, for example, rules for performing predetermined actions when a party joints a multiparty conversation, rules for performing predetermined actions when a party does not joint a multiparty conversation, rules for performing predetermined actions when a provider does not joint a multiparty conversation, rules for escalating the request to a network representative when a provider does not respond within a predetermined time period, rules for handling notifications, rules for performing predetermined actions when a duplicate conversation with the same customer related to the same service is found, rules for transferring the customer to another provider, rules for managing workflows, and so forth. The actions may include sending messages, sending messages after a certain period of time, excluding a party from the multiparty conversation, escalating the message back to the brand based on predetermined criteria, switching from one supplier to another, managing duplicate providers via separate channels of communication, reporting to the provider via a separate message and suggesting an action every time a customer sends a message to the conversation, and the like.

The system of the present disclosure may provide responsiveness by creating a perception of an instant response. For example, if the system receives a request for the service from the customer, and the provider selected by the customer is not available, the system may reassign the request to another provider. Another provider may join the communication and provide an instant response to the customer.

In an example embodiment, the system of the present disclosure may track how long it takes the provider to respond to the customer. If the provider does not respond within a predetermined time, the system may send a predetermined message to the customer on behalf of the provider, such as "Hey, I'm busy right now, but I'll get back to you within the next hour."

If the provider does not respond within a further predetermined time period, the system of the present disclosure may automatically send a further predetermined message, such as "Hi, it looks like [Provider] is too busy. Maybe we can help you." These communications sent to the customer may make the customer feel that the customer is being paid attention to while the original provider is not able to pay attention. The system may send messages periodically to the customer to maintain the multiparty conversation. The system may switch the provider to a further provider if no response is received from the provider within a predetermined time.

Additionally, the network representative may see all messages of the multiparty conversation exchanged between the customer and the provider. This may help the brand to resolve issues with respect to the service when the issues occur.

Referring now to the drawings, various embodiments are described in which like reference numerals represent like parts and assemblies throughout the several views. It should be noted that the reference to various embodiments does not limit the scope of the claims attached hereto. Additionally, any examples outlined in this specification are not intended to be limiting and merely set forth some of the many possible embodiments for the appended claims.

FIG. 1 shows an example environment 100 suitable for practicing systems and methods for establishing at least three-way conversation between a primary party, secondary parties, and one or more brand agents within an SDN as described herein. It should be noted, however, that the environment 100 is just one example and is a simplified embodiment provided for illustrative purposes, and reasonable deviations of this embodiment are possible as will be evident to those skilled in the art.

As shown in FIG. 1, the environment 100 may include an entity A 102 including one or more brand agents, an entity B 104 including a secondary party that is a provider of a service, an individual C 106 including a primary party that is a customer requesting for the service, a data network 108, and a system for establishing at least three-way conversation between a primary party, secondary parties, and one or more brand agents within an SDN 110, which is also referred herein to as an SDN conversation system 110 or a system 110. The environment 100 illustrates a contractual relationship that may be established between entities such as a brand, a provider, and a customer responsible for delivering a service allowing conversations to be initiated, conducted, and managed by the SDN conversation system 110 between the brand, the customer, and the provider. FIG. 1 also illustrates a contractual relationship that may be established between a brand and a customer, a brand and a provider, or a provider and a customer. To participate in the methods and systems of the present disclosure, a customer may be asked to provide certain permissions as part of the then-current regulatory program and brand's contractual terms requesting the customer to opt-in or opt-out from certain type of interactions or messages that may be shared as part of the relationship to be formed in the SDN. Once the customer, the brand, and/or the provider enter into a relationship to participate in the system 110, the system 110 may allow the customer, the brand, and the provider to send messages in real time to each other for current updates about the products and services procured from the brand and to be delivered by the provider.

As way of an example, FIG. 1 illustrates a simple case of an SDN consisting of two entities, the entity A 102 and the entity B 104, that together provide a service to the individual C 106. The individual C 106 is a direct customer of the entity A 102 and has requested a service from the entity A 102. As a consequence of its customer relationship with the entity A 102, the individual C 106 gives consent to the entity A 102 to provide communication to the individual C 106. Contractual language may be included in an agreement defining relationship between the entity A 102 and the individual C 106 to extend that consent to allow related parties to provide communications to the individual C 106 to deliver the requested service to the individual C 106.

The entity B 104 may then be contracted with the entity A 102 to provide services to the individual C 106 on behalf of the entity A 102. Contractual language may be included to grant the permission of the entity A 102 to start conversations on behalf of the entity B 104 with customers such as the individual C 106, where such conversation may happen only if the entity A 102 has the required consent for such conversations from the individual C 106. As a consequence of its customer relationship between the entity A 102 and the individual C 106; the service provider relationship between the entity A 102 and the entity B 104; and the essential contractual language heretofore described; the entity B 104 may be permitted to provide communication to the individual C 106 to deliver the services to the individual C 106, and the entity A 102 may be permitted to start conversations between the entity B 104 and the individual C 106 to facilitate the delivery of the services by the entity B 104 to the individual C 106 on behalf on the entity A 102.

In an example embodiment, the entity A 102, the entity B 104, and the individual C 106 may communicate with each other and the system 110 via the data network 108. The data network 108 can refer to any wired, wireless, or optical networks including, for example, the Internet, intranet, local area network (LAN), Personal Area Network, Wide Area Network (WAN), Virtual Private Network, cellular phone networks (e.g., Global System for Mobile (GSM) communications network), 3G, 4G, 5G network, Wi-Fi™ network, packet switching communications network, circuit switching communications network), Bluetooth™ radio, Ethernet network, an IEEE 1002.11-based radio frequency network, a Frame Relay network, Internet Protocol (IP) communications network, or any other data communication network utilizing physical layers, link layer capability, or network layer to carry data packets, or any combinations of the above-listed data networks. In some embodiments, the data network 108 may include a corporate network, data center network, service provider network, mobile operator network, or any combinations thereof.

In some embodiments, the system 110 may be implemented as a server(s) or a cloud-based computing resource(s) shared by multiple users. The system 110 can include hardware and software available at a remote location and accessible over a data network 108. The system 110 can be dynamically re-allocated based on demand. The cloud-based computing resource(s) may include one or more server farms/clusters including a collection of computer servers that can be co-located with network switches and/or routers.

Figure 2:
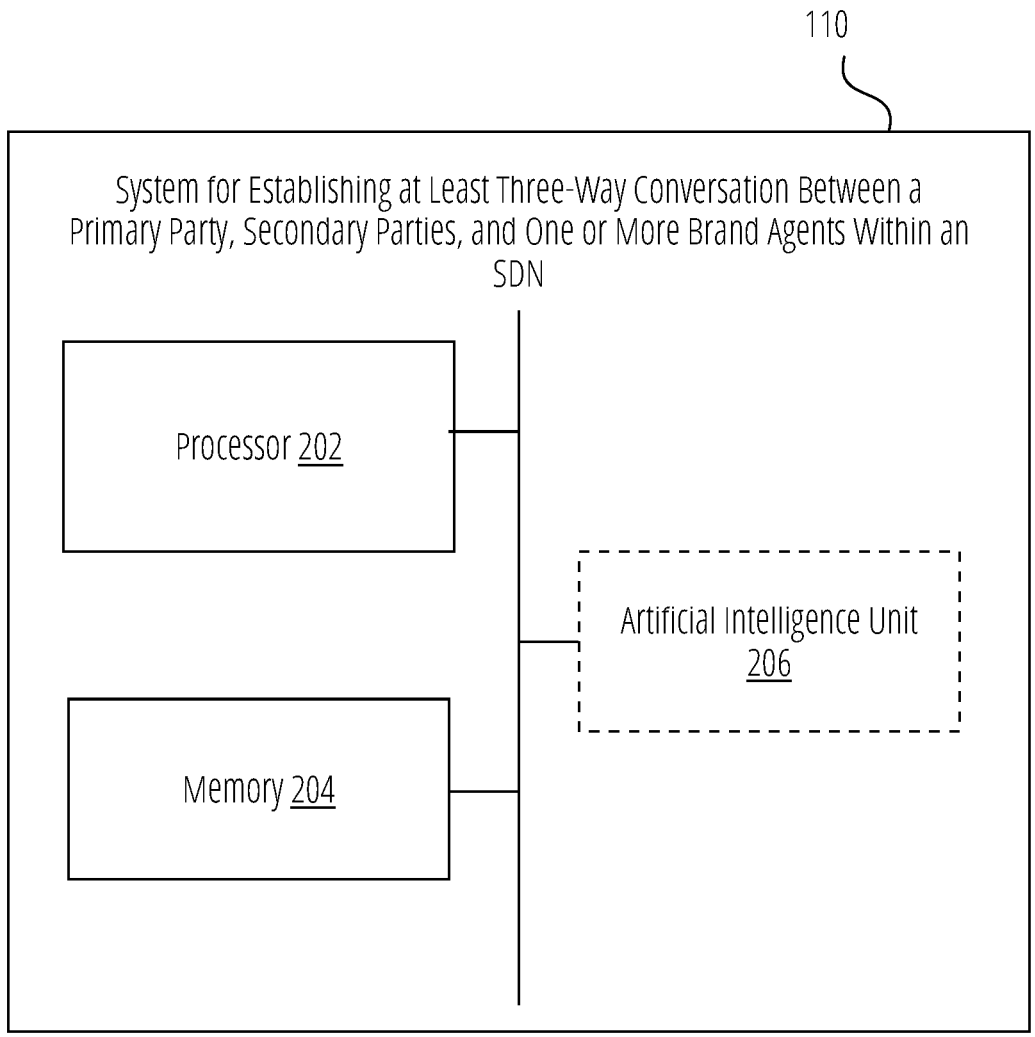
FIG. 2 is a block diagram illustrating a system for establishing at least three-way conversation between a primary party, secondary parties, and one or more brand agents within an SDN, according to an example embodiment.

FIG. 2 is a block diagram illustrating a system 110 for establishing at least three-way conversation between a primary party, secondary parties, and one or more brand agents within an SDN, according to an example embodiment. The primary party may include an individual and the secondary parties may include a plurality of further individuals that act as providers of a service. The system 110 may include a processor 202 and a memory 204 configured to store instructions executable the processor 202. The system 110 may further optionally include an Artificial Intelligence (AI) unit 206.

The processor 202 may be configured to receive a request for a service from a customer via a user interface associated with an SDN. Upon receiving the request, the processor 202 may initiate a two-way communication channel between the primary party and the one or more brand agents. Specifically, the processor 202 may initiate the two-way communication channel between a first communication endpoint associated with the primary party and a second communication endpoint assigned to the one or more brand agents. The one or more brand agents may be associated with a brand. The secondary parties may include entities independent from the brand.

In an example embodiment, the initiating of the two-way communication channel between the one or more brand agents and the primary party may include sending messages over an interprocess communication channel. The primary party may be enabled to choose to switch the two-way communication channel to an SMS channel or a further channel. The primary party may be enabled to switch back to the interprocess communication channel or the further channel. A plurality of at least three-way conversations may continue after the primary party chooses, any of the two-way communication channel, the SMS channel, and the further channel to communicate.

Upon the initiating the two-way communication channel, the processor 202 may receive, from the one or more brand agents, a selection of one or more secondary parties from a database of the secondary parties. In an example embodiment, the processor 202 may first receive, from the one or more brand agents, an instruction to add the secondary party to the database. The processor 202 may add the one or more secondary parties to the database in response to the instruction and, upon adding, receive the selection of the secondary party from the database.

The processor 202 may be further configured to synthesize, upon receiving the selection of the secondary party, a URL for a secondary party of the one or more secondary parties to join the two-way communication channel. Upon synthesizing the URL, the processor 202 may provide the URL to a third communication endpoint associated with the secondary party. The third communication endpoint may be used by the secondary party to join the two-way communication channel. The third communication endpoint associated with the secondary party may be different from the second communication endpoint assigned to the one or more brand agents.

In an example embodiment, the URL may be shared by the one or more brand agents with the secondary party via an SMS message sent to the secondary party. The SMS message may be synthesized using metadata associated with the primary party and metadata associated with a service for which the secondary party is responsible. In an example embodiment, the URL may be temporary and may expire within a predetermined time to limit the time when the secondary party is enabled to join the at least three-way conversation.

Upon detecting that the secondary party clicked the URL, the processor 202 may initiate the at least three-way conversation between the primary party, the secondary party, and the one or more brand agents via the two-way communication channel.

In an example embodiment, the primary party may communicate with the one or more brand agents and the secondary party via an SMS between a phone number of the primary party and a phone number provisioned for the brand. Messages sent by the secondary party to the primary party may be received by the brand and sent by the brand from the phone number provisioned for the brand to the phone number of the primary party.

In an example embodiment, upon receiving the selection of the one or more secondary parties from the database, the processor 202 may simultaneously start a communication channel between the one or more brand agents and each of the one or more secondary parties. Upon starting the communication channel, the processor 202 may provide, via the communication channel, metadata associated with the primary party to the one or more secondary parties. In response to sending the metadata to the one or more secondary parties, the processor 202 may receive a feedback from the one or more secondary parties. Based on the feedback received from the one or more secondary parties, the processor 202 may enable the primary party to inquire for information associated with the one or more secondary parties. Upon providing the information received from the one or more secondary parties to the primary party, the processor 202 may enable the primary party to select the secondary party from the one or more secondary parties.

In an example embodiment, the processor 202 may be configured to receive, from the primary party, a selection of one or more further secondary parties from the one or more secondary parties. Based on the selection, the processor 202 may enable the brand to provision the further secondary parties with individual phone numbers. Specifically, each of the further secondary parties may be provisioned with an individual phone number. The processor 202 may initiate further at least three-way conversations between the primary party, the one or more brand agents, and each of the further secondary parties via the two-way communication channel. The primary party and the further secondary parties may communicate via the SMS between a phone number of the primary party and the individual phone numbers provisioned for the further secondary parties. More specifically, the primary party may communicate with each specific further secondary party via the SMS between the phone number of the primary party and an individual phone number provisioned for this specific further secondary party.

In an example embodiment, the processor 202 may be further configured to enable the one or more brand agents to communicate through the two-way communication channel via an application. The application may enable the one or more brand agents to monitor, review, participate in, and manage adding and dropping of parties to the at least three-way conversation between the primary party and the secondary parties. The application may include one of the following: a standalone application and an application embedded within a further application in use by the one or more brand agents.

In an example embodiment, the processor 202 may be further configured to label messages sent in the at least three-way conversation to indicate, to the primary party, whether it is the secondary party or the one or more brand agents who sends the messages. The labels may be automatically synthesized based on metadata associated with the secondary party and metadata associated with the brand.

In an example embodiment, the processor 202 may be further configured to announce the joining of the secondary party with an announcement message. The announcement message may be synthesized based on metadata associated with the secondary party, thereby indicating, to the primary party, that the secondary party is present in the at least three-way conversation.

In an example embodiment, the processor 202 may be further configured to enable the one or more brand agents to drop the secondary party. The dropping may cause sending a notification to the primary party notifying that the secondary party is no longer in the at least three-way conversation. Upon the dropping, the processor 202 may enable the one or more brand agents to add a further secondary party to the at least three-way conversation.

The processor 202 may be further configured to enable the one or more brand agents to add several secondary parties and drop the secondary parties under the control of the brand. The processor 202 may announce an arrival and a departure of any of the secondary parties. The processor 202 may further label messages of the secondary parties and the one or more brand agents to indicate, to the primary party, a party sending the messages and a party currently participating in the at least three-way conversation.

In an example embodiment, the processor 202 may be further configured to enable the one or more brand agents to hand off a control to the secondary party. The processor 202 may further enable the secondary party to send a notice to the primary party on the two-way communication channel that the brand is handing responsibility to the secondary party. The notice may notify the primary party that a further two-way communication channel is to be initiated between a phone number associated with the primary party and a phone number provisioned for the secondary party. The processor 202 may be configured to send a further URL to one or more further secondary parties and to the one or more brand agents inviting the one or more further secondary parties and the one or more brand agents to join the further two-way communication channel.

The processor 202 may be further configured to organize the one or more brand agents and the secondary parties into categories. The categories may be representative of a role played by the one or more brand agents and the secondary parties in the SDN. The role may include one of the following: a driver, a merchant, a customer, a support for on-demand delivery, and so forth.

In an example embodiment, messages sent in the at least three-way conversation may include pre-defined templated messages having parameters partially or fully completed before the messages are sent. The pre-defined templated messages may be generated using metadata associated with one or more of the brand, the primary party, the secondary parties, and a service for which the brand, the primary party, and the secondary parties are engaged. The pre-defined template messages may be categorized by a role, and a party associated with the role may be enabled to see the pre-defined template messages associated with the role.

The processor 202 may be further configured to sort, label, and segment multiple simultaneous conversations under control of the one or more brand agents in an application used by the brand as the primary party to help facilitate management of the multiple simultaneous conversations.

The processor 202 may be further configured to receive, from the one or more brand agents or a further party, a request for a location of any of the primary party and the secondary parties. Upon receiving an approval from the primary party or the secondary parties, the processor 202 may share the location by sending a pre-defined templated message by the one or more brand agents or the further party to the primary party or the secondary parties. The pre-defined templated message may include a further URL. The further URL, when clicked, uses location services of a device used by the primary party or the secondary parties to communicate to share, upon the receiving of the approval from the primary party or the secondary parties, the location of the primary party or the secondary parties to enable all the parties to know the location of the primary party or the secondary parties. The sharing of the location may be in a form of a follow-me map continuously updating the location of any of the primary party and the secondary parties to all the parties on the at least three-way conversation.

The processor 202 may be further configured to enable the one or more brand agents and the secondary parties to annotate the at least three-way conversation and share notes that may be invisible to the primary party.

The processor 202 may be further configured to enable the one or more brand agents and all the secondary parties to conduct separate two-way conversations or multiparty conversations associated with the at least three-way conversation. The two-way conversations and the multiparty conversations may be invisible to the primary party for purposes of coordinating support for the primary party. The two-way conversations and the multiparty conversations may remain associated with the at least three-way conversation with the primary party.

The processor 202 may be further configured for the one or more brand agents to export the at least three-way conversation via one of a copy/paste command, an export to Portable Document Format command, posting to an integrated application, and a further method of transferring conversational data associated with the least three-way conversation and selected prior conversations including annotations and associated side conversations. The export may be performed to a further application through a user interface or through an automated action triggered by a content of a message or an action being internal or external to a system associated with the SDN.

The processor 202 may be further configured to send, in response to a keyword or a message content received from a party having a role, an automatic reply by an automated system. An interpretation of the message content and a synthesis of the automatic reply may be based on one of the following: a lookup, an algorithm, machine learning, a statistical model, a computational method, and so forth. The interpretation may be performed to interpret a natural language of a message in the at least three-way conversation from the party having the role and determine which one of the parties is to respond. In response to the determining that one of the parties needs to respond, the processor 202 may perform one of the following operations: synthesize a response message, invite a further party and synthesize a further response message, and take a predetermined action.

The processor 202 may be further configured to determine that the service has been provided by the secondary party to the primary party. Based on the determining, the processor 202 may receive a request from the one or more brand agents to close the at least three-way conversation. Upon closing the conversation, the secondary party may be removed from the two-way communication channel and a message may be sent to the primary party through the two-way communication channel to inform the primary party that the secondary party has left the two-way communication channel. Moreover, upon closing of the conversation, a customer satisfaction survey may be sent out to the primary party through the two-way communication channel.

The processor 202 may be further configured to determine an absence of a response of the secondary party to a message with the URL and send a predetermined message on behalf of the secondary party to the primary party.

In an example embodiment, when a primary party wants to request a service to be provided by the SDN, the primary party may make a call to one or more brand agents of the SDN, such as a brand. In response to receiving the call with the request for the service from the primary party, the one or more brand agents may send a message to the primary party via an SMS.

Figure 3:
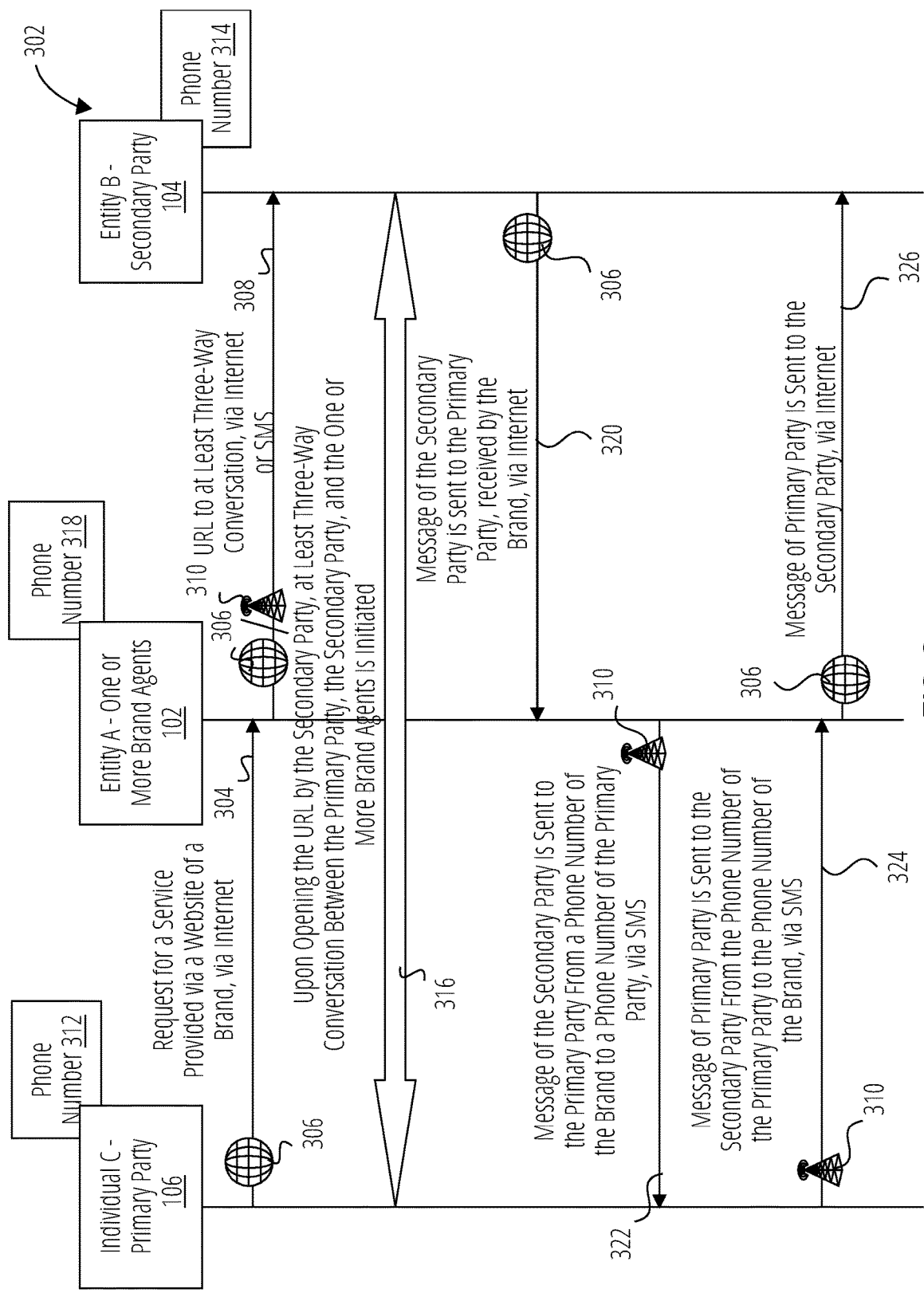
FIG. 3 is a schematic diagram illustrating establishing at least three-way conversation between a primary party, a secondary party, and one or more brand agents, according to an example embodiment.

FIG. 3 is a schematic diagram 302 illustrating establishing at least three-way conversation between a primary party shown as an individual C 106, a secondary party shown as an entity B 104, and one or more brand agents shown as an entity A 102, according to an example embodiment. The primary party may include a customer. The one or more brand agents may be associated with the brand. The secondary party may include a provider of a service.

The customer may want to receive a service from the brand. To request for the service, the customer may send a request 304 for the service to the brand. In an example embodiment, the customer may send the request 304 for the service via an Internet connection 306 and using a user interface associated with an SDN. For example, the customer may access a website of the brand using a browser running on a user device of the customer and send the request via a user interface associated with the website.

Upon receiving the request 304 from the customer on the website of the brand, the one or more brand agents may synthesize a URL 308 for a provider to join the two-way communication channel and send the URL 308 to the provider. In some example embodiments, the one or more brand agents may send the URL 308 via an SMS 310 to a phone number 314 of the provider. In example embodiments, when the provider has an application (i.e., a software agent) associated with the brand and running on a user device of the provider, the one or more brand agents may send the URL 308 via the Internet connection 306 to the application used by the provider.

Upon the provider opening the URL 308, an at least three-way conversation 316 between the customer, the provider, and the one or more brand agents may be initiated. Furthermore, the opening the URL 308 by the provider may cause opening a user interface associated with the brand on the user device of the provider. The provider may use the user interface to send a message 320 in response to the request 304 of the customer. The message 320 may be sent via the Internet connection 306 using an application or a web site associated with the brand.

The one or more brand agents may receive the message 320 from the provider. To initiate an SMS connection with the customer, the one or more brand agents may provision a phone number 318 and associate the phone number 318 with the at least three-way conversation 316. The phone number 318 may be a phone number in control of the brand and assigned by the brand to the provider and the at least three-way conversation 316. The phone number 318 may differ from the phone number 314 of the provider to which the provider has access on the user device of the provider. Next, the one or more brand agents may send the message 320 of the provider to the customer in a form of a message 322 via the SMS 310. The message 322 may be sent from the phone number 318 assigned to the at least three-way conversation 316 to the phone number 312 of the customer. Additionally, the one or more brand agents may send messages to the customer on behalf of the brand. The messages to the customer on behalf of the brand may be sent to the customer from the same phone number 318 assigned to the at least three-way conversation 316.

To reply to the provider, the customer may send a message 324 to the phone number 318 via the SMS 310 from the phone number 312 of the customer. The one or more brand agents may receive the message 324 on the phone number 318 and resend the message 324 in a form of a message 326 to the provider via the Internet connection 306. The provider may receive the message 326 via the user interface associated with the brand and opened on the user device of the provider.

Therefore, as the customer receives both the messages from the one or more brand agents and the messages from the provider from the same phone number 318, both the messages from the one or more brand agents and the messages from the provider are shown to the customer in a single SMS conversation. Accordingly, all messages related to the at least three-way conversation 316 are provided to the user in the single SMS conversation. Thus, the customer does not need to switch between different conversations with multiple parties as all messages are provided in the single SMS conversation.

Figure 4:
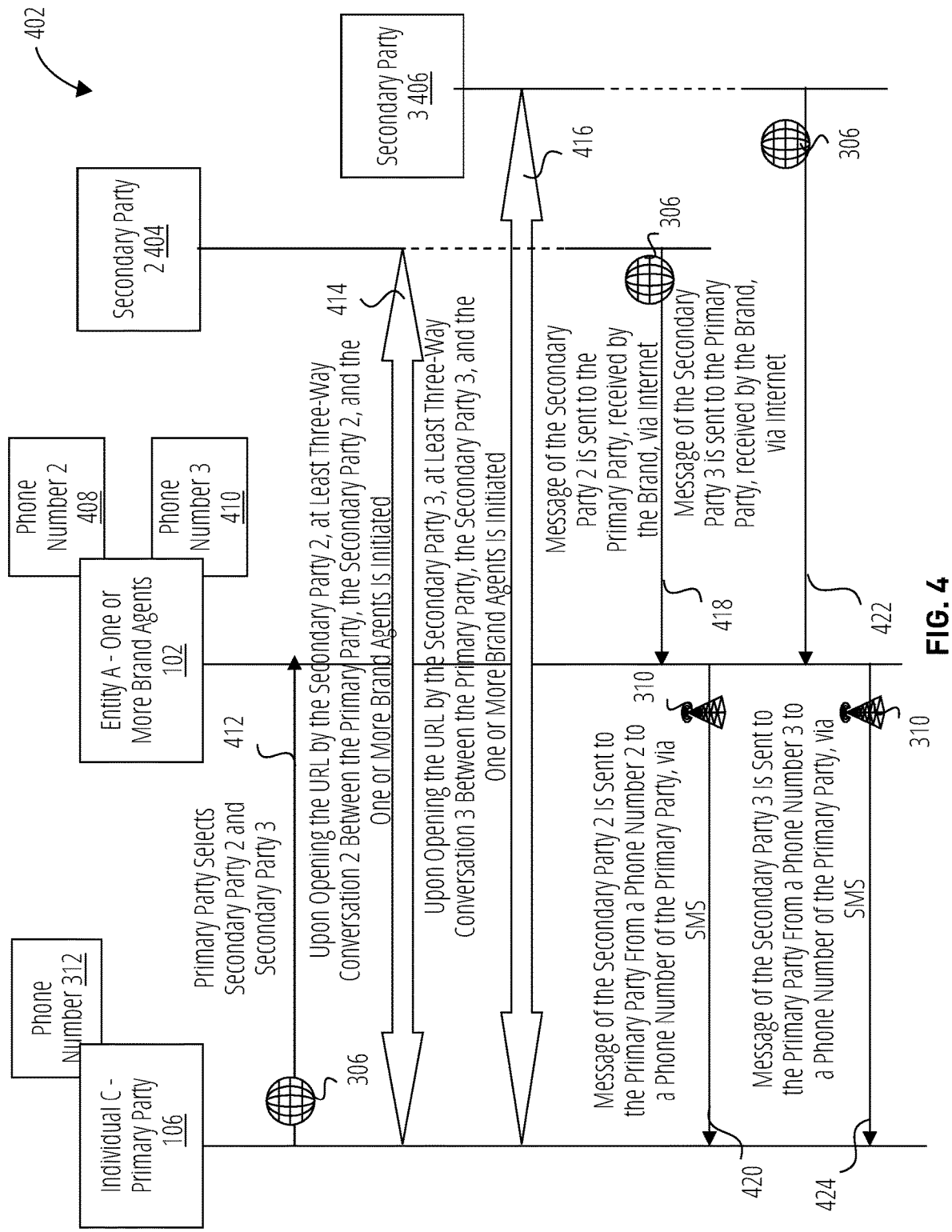
FIG. 4 is a schematic diagram illustrating establishing at least three-way conversation between a primary party, a plurality of secondary parties, and one or more brand agents, according to an example embodiment.

FIG. 4 is a schematic diagram 402 illustrating establishing at least three-way conversation between a primary party shown as an individual C 106, two secondary parties shown as a secondary party 2 404 and a secondary party 3 406, and one or more brand agents shown as an entity A 102, according to an example embodiment. The primary party may include a customer. The one or more brand agents may be associated with the brand. The secondary party 2 404 and a secondary party 3 406 may include providers of a service.

The customer may want to receive a service from the brand. To request the service, the customer may send a request for the service to the brand. The request may include a selection 412 of two secondary parties to provide the service, namely a secondary party 2 404 and a secondary party 3 406. In an example embodiment, the customer may send the request for the service via an Internet connection 306 and using a user interface associated with an SDN. For example, the customer may access a website of the brand using a browser running on a user device of the customer and send the request via a user interface associated with the website.

Upon receiving the request and the selection 412 from the customer on the website of the brand, the one or more brand agents may synthesize an individual URL for the secondary party 2 404 to join a first at least three-way conversation 414 and send the individual URL to the secondary party 2 404. Upon opening the individual URL by the secondary party 2 404, the first at least three-way conversation 414 between the customer, the secondary party 2 404, and the one or more brand agents may be initiated.

The one or more brand agents may further synthesize a further individual URL for the secondary party 3 406 to join a second at least three-way conversation 416 and send the individual URL to the secondary party 3 406. Upon opening the further individual URL by the secondary party 3 406, the second at least three-way conversation 416 between the customer, the secondary party 3 406, and the one or more brand agents may be initiated.

The opening of the individual URL by the secondary party 2 404 may cause opening a user interface associated with the brand on the user device of the secondary party 2 404. The secondary party 2 404 may use the user interface to send a message 418 to the customer. The message 418 may be sent via the Internet connection 306.

The one or more brand agents may receive the message 418 from the secondary party 2 404. To initiate an SMS connection with the customer, the one or more brand agents may provision a phone number 2 408 and associate the phone number 2 408 with the first at least three-way conversation 414. The phone number 2 408 may be a phone number in control of the brand and assigned by the brand to the secondary party 2 404 and the first at least three-way conversation 414. Next, the one or more brand agents may send the message 418 of the secondary party 2 404 to the customer in a form of a message 420. The message 420 may be sent from the phone number 2 408 assigned to the first at least three-way conversation 414 to the phone number 312 of the customer via SMS 310. Additionally, the one or more brand agents may send messages related to the first at least three-way conversation 414 to the customer on behalf of the brand. The messages to the customer on behalf of the brand may be sent to the customer from the same phone number 2 408 assigned to the first at least three-way conversation 414.

Similarly, the opening of the further individual URL by the secondary party 3 406 may cause opening a user interface associated with the brand on the user device of the secondary party 3 406. The secondary party 3 406 may use the user interface to send a message 422 to the customer. The message 422 may be sent via the Internet connection 306 using an application or a website associated with the brand.

The one or more brand agents may receive the message 422 from the secondary party 3 406. To initiate an SMS connection with the customer, the one or more brand agents may provision a phone number 3 410 and associate the phone number 3 410 with the second at least three-way conversation 416. The phone number 3 410 may be a phone number in control of the brand and assigned by the brand to the secondary party 3 406 and the second at least three-way conversation 416. Next, the one or more brand agents may send the message 422 of the secondary party 3 406 to the customer in a form of a message 424. The message 424 may be sent from the phone number 3 410 assigned to the second at least three-way conversation 416 to the phone number 312 of the customer via SMS 310. Additionally, the one or more brand agents may send messages related to the second at least three-way conversation 416 to the customer on behalf of the brand. The messages to the customer on behalf of the brand may be sent to the customer from the same phone number 3 410 assigned to the second at least three-way conversation 416.

Therefore, the customer may provide one request for the service, select several providers of the service, and have a separate SMS conversation with each of the providers. The one or more brand agents may have access to the SMS conversations of the customer with the providers and send messages related to the service to the customer in the SMS conversations.

Figure 5:
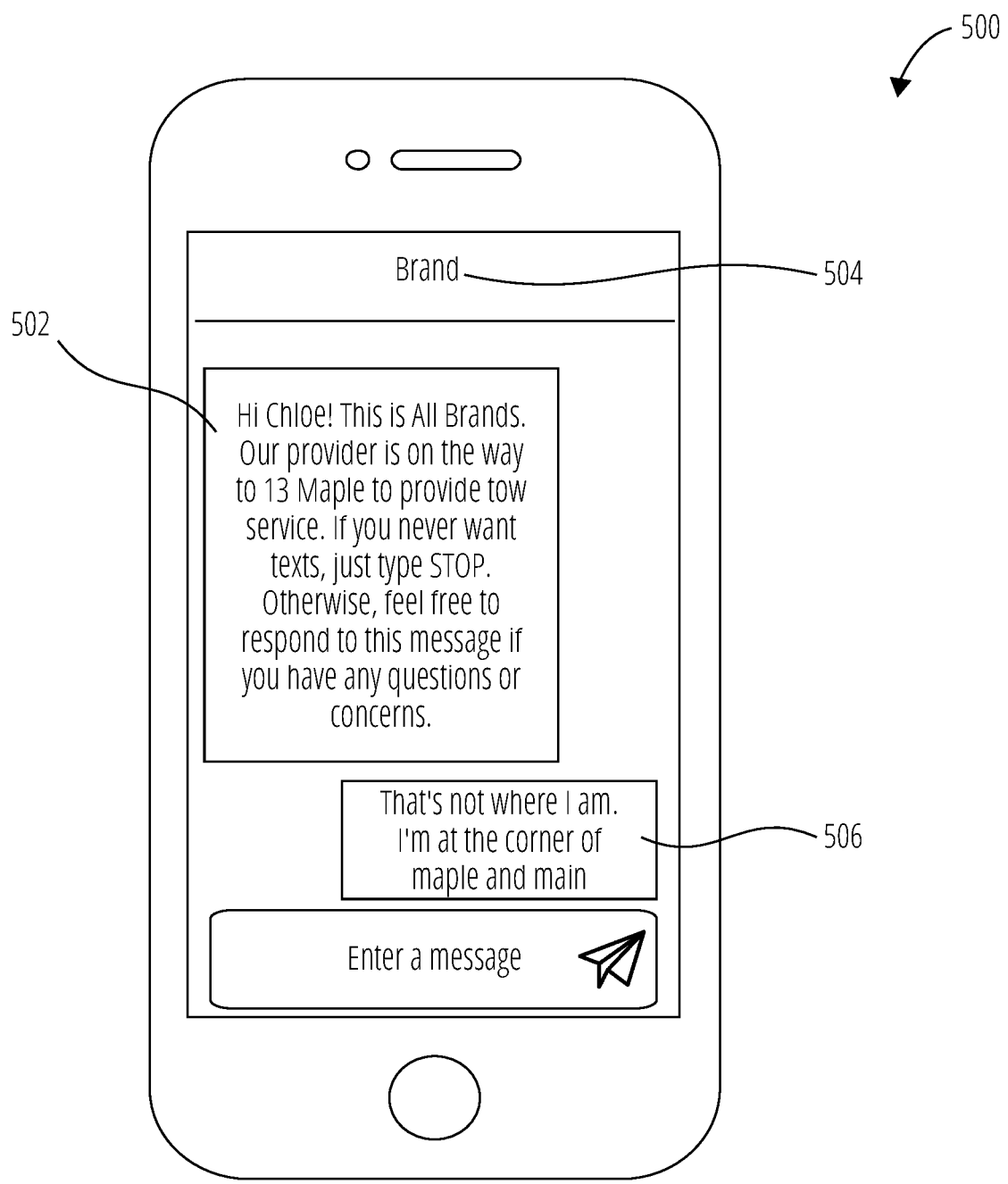
FIG. 5 illustrates a user interface shown to a customer via a user device of the customer upon receiving a message by the customer from a brand, according to an example embodiment.

FIG. 5 illustrates a user interface 500 shown to the customer via a user device of the customer upon the customer receiving a message 502 from the brand, according to an example embodiment. The brand may send the message 502 to the customer in response to receiving a request for the service from the customer via the website of the brand. In the request, the customer may provide a phone number of the customer. The message 502 may be received by the customer via an SMS to the phone number of the customer. The user interface 500 may display the message 502 and a name 504 of a sender of the message 502 (e.g., the brand). The message 502 may prompt the customer to provide additional metadata related to the customer and the service such as, for example, a current location of the customer, additional services to the provided, and so forth. The customer may respond to the brand by sending a message 506 with information requested by the brand in the message 502. The message 506 may be sent by the customer via an SMS from the phone number of the customer.

Figure 6:
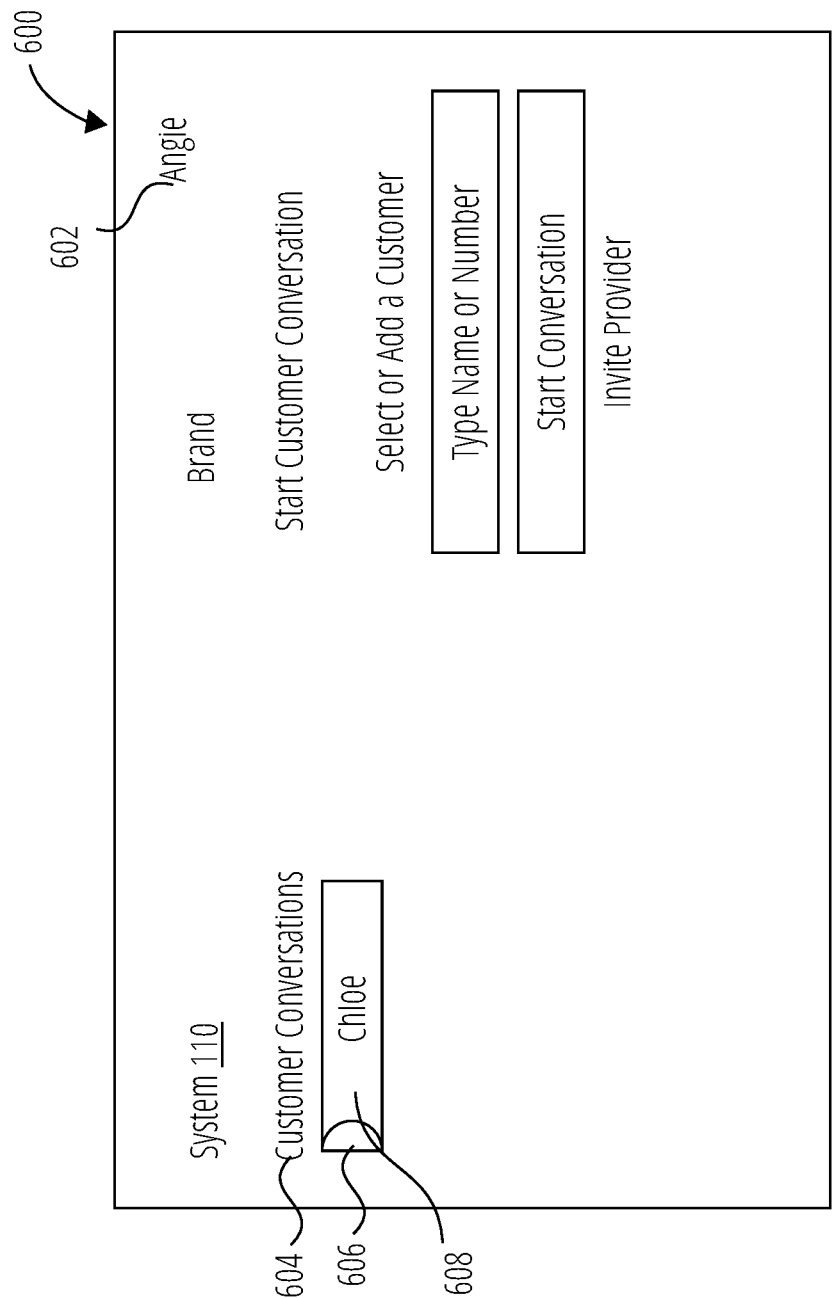
FIG. 6 illustrates a user interface shown to a network representative upon receiving a message by a system, according to an example embodiment.

FIG. 6 illustrates a user interface 600 shown to a network representative 602 (i.e., one or more brand agents) upon receiving the message 506 by the system 110, according to an example embodiment. The user interface 600 may show a list 604 of all active conversations of the network representative 602 with customers. Upon receiving the message 506 from the customer, an indicator 606 may be displayed to notify the network representative 602 that the message 506 from the customer has been received. The network representative 602 may select a conversation 608 to read the message 506 from the customer.

Figure 7:
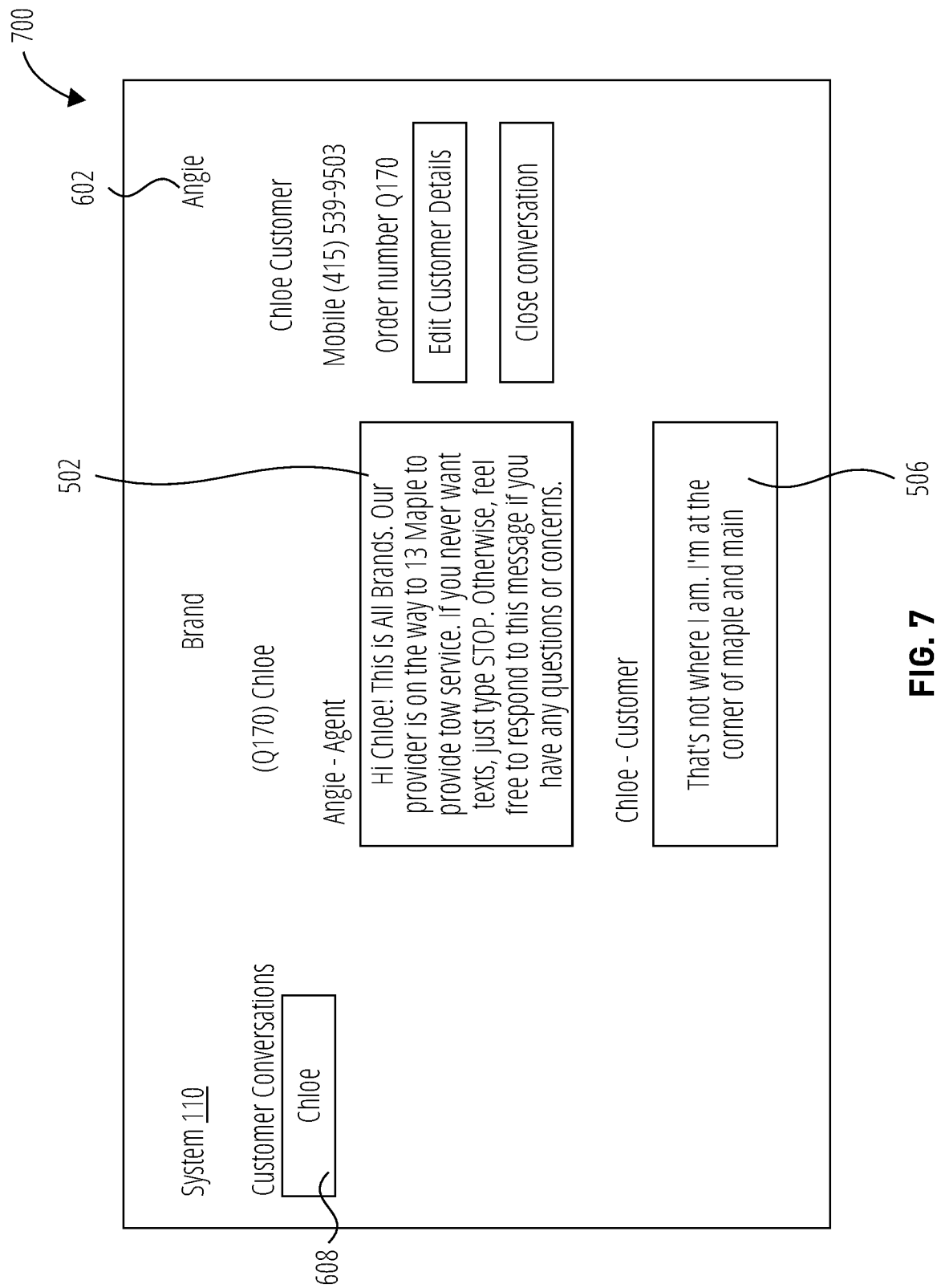
FIG. 7 illustrates a user interface displayed to a network representative upon selecting a conversation, according to an example embodiment.

FIG. 7 illustrates a user interface 700 displayed to the network representative 602 upon selecting the conversation 608, according to an example embodiment. The user interface 700 may display all messages communicated between the network representative 602 and the customer, such as the message 502 sent to the customer and the message 506 received from the customer.

Figure 8:
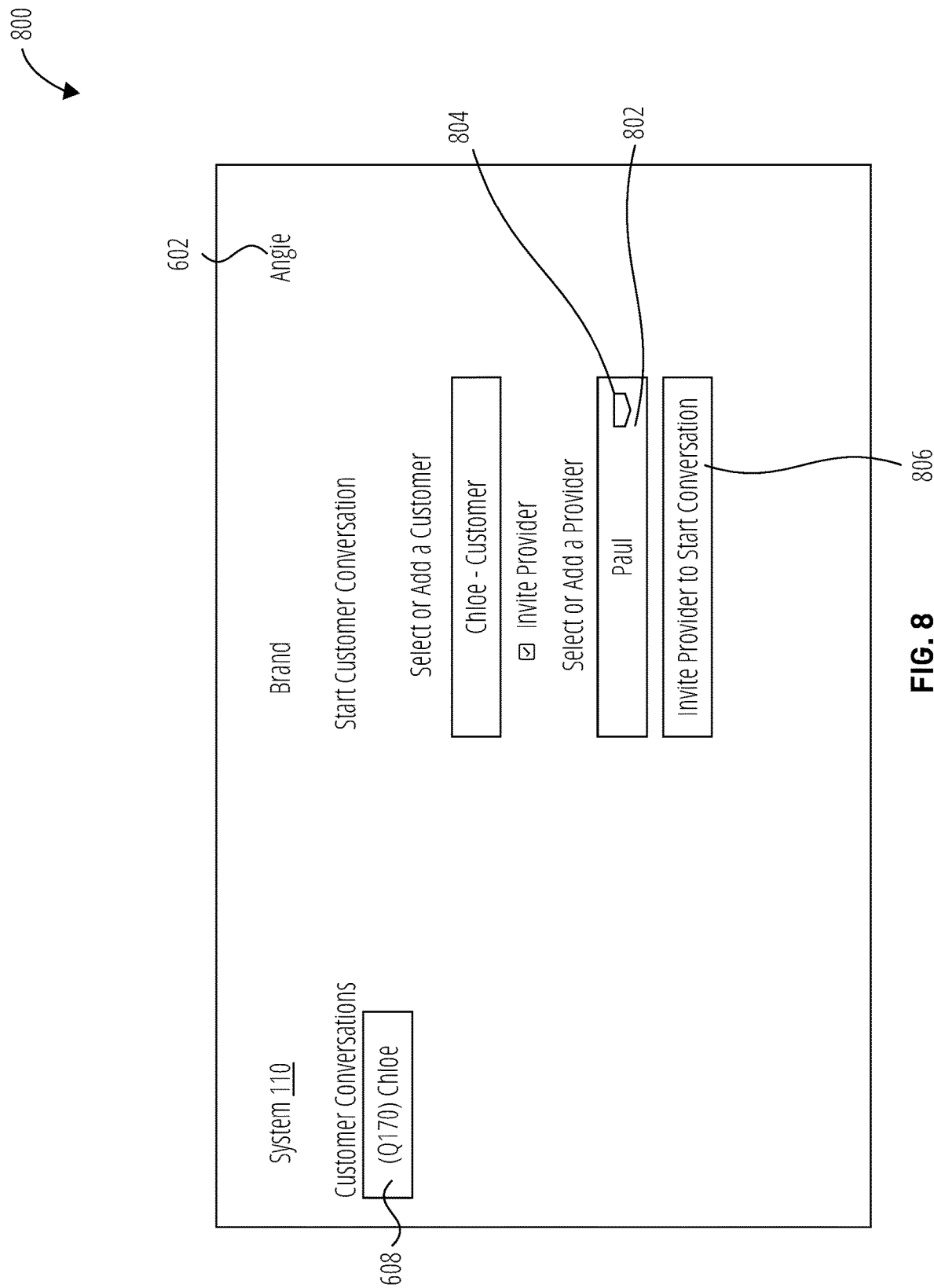
FIG. 8 illustrates a user interface displayed to a network representative to enable the network representative to select a provider to provide service to a customer, according to an example embodiment.

FIG. 8 illustrates a user interface 800 displayed to the network representative 602 to enable the network representative 602 to select a provider to provide the service to the customer, according to an example embodiment. The network representative 602 may select a provider 802 from a list 804 of providers associated with the service. The selection of the provider 802 may be made based on the information provided by the customer in the request for the service. Upon selecting the provider 802, the network representative 602 may select an invite icon 806 to invite the provider 802 to join the conversation with the customer.

Figure 9:
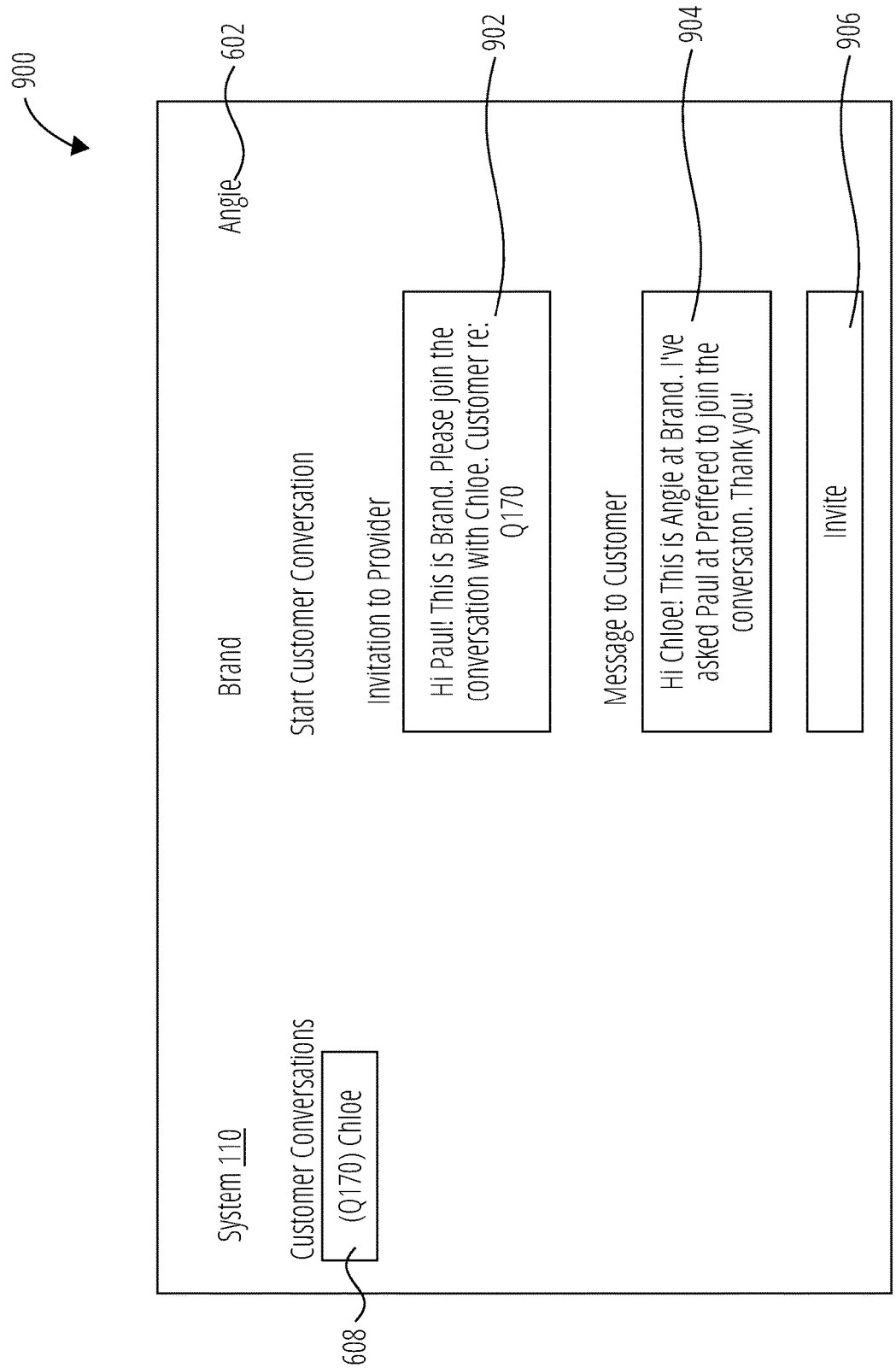
FIG. 9 illustrates a user interface displayed to a network representative upon selecting a provider, according to an example embodiment.

FIG. 9 illustrates a user interface 900 displayed to the network representative 602 upon selecting the provider, according to an example embodiment. The user interface 900 shows a message 902 to be sent to the provider via an SMS upon clicking an invite icon 806 by the network representative 602. A phone number of the provider may be preliminarily stored in a database associated with the brand. The user interface 900 further shows a message 904 to be sent via an SMS to the customer upon clicking the invite icon 806 by the network representative 602. In the message 904, the network representative 602 may notify the user that a particular provider is selected for providing the service and will join the conversation soon. The network representative 602 may change any of the message 902 and the message 904 before clicking the invite icon 906.

Figure 10:
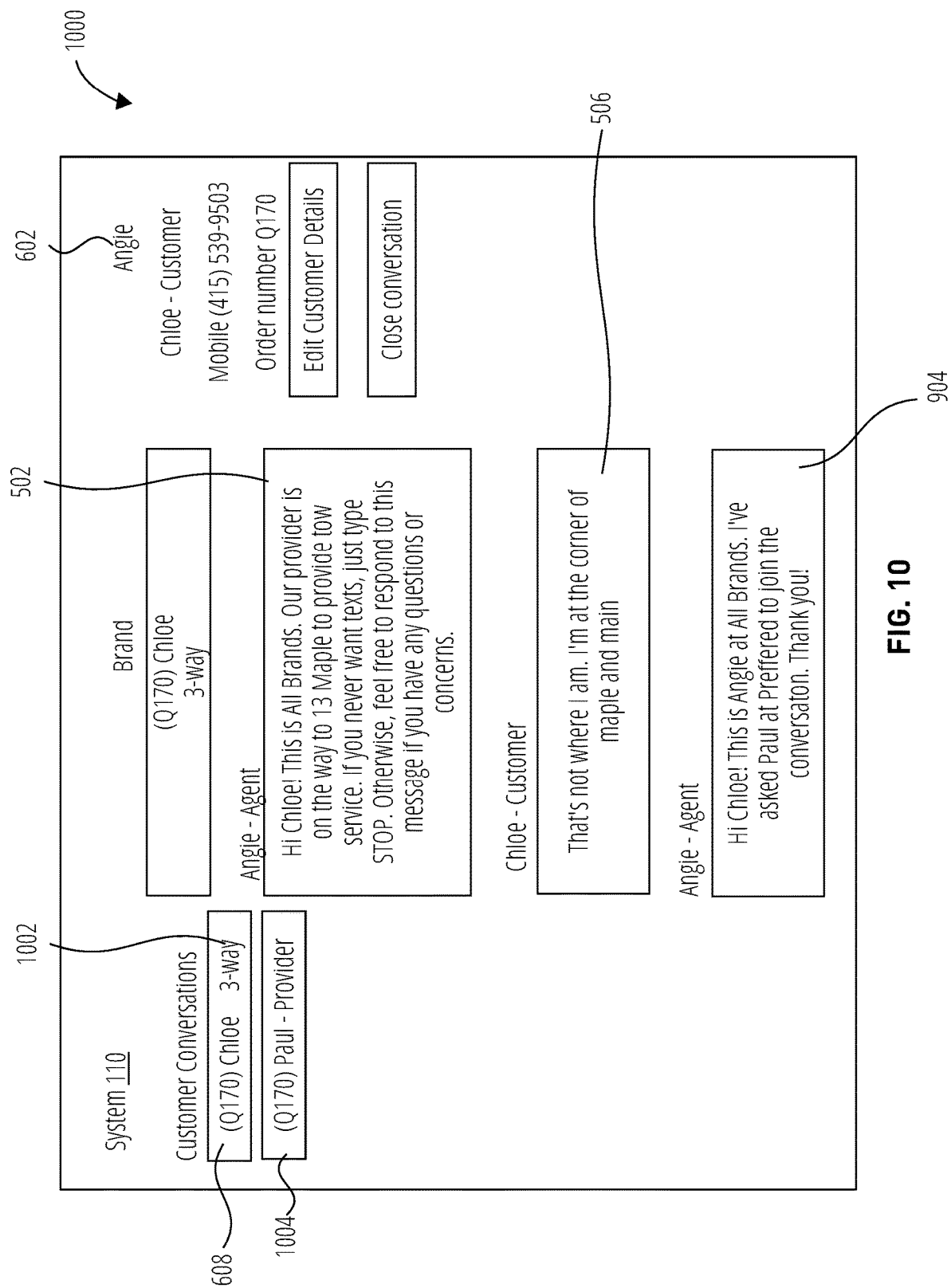
FIG. 10 illustrates a user interface displayed to a network representative upon selecting a three-way conversation, according to an example embodiment.

FIG. 10 illustrates a user interface 1000 displayed to the network representative 602 upon selecting the three-way conversation 608, according to an example embodiment. Upon inviting the provider to join the conversation with the customer, the conversation 608 between the network representative 602 and the customer becomes a three-way conversation between the network representative 602, the customer, and the provider. An indicator 1002 may be displayed in the conversation 608 to show that the provider has been invited to the conversation 608 and that the conversation 608 is now the three-way conversation.

The user interface 1000 may display all messages communicated between the network representative 602 and the customer. The messages may include the message 502 sent to the customer by the network representative 602, the message 506 received from the customer by the network representative 602, and the message 904 sent to the customer by the network representative 602 upon inviting the provider.

The user interface 1000 may further display a conversation 1004 with the provider. Upon selecting the conversation 1004, a user interface shown in FIG. 11 may be provided to the network representative 602.

Figure 11:
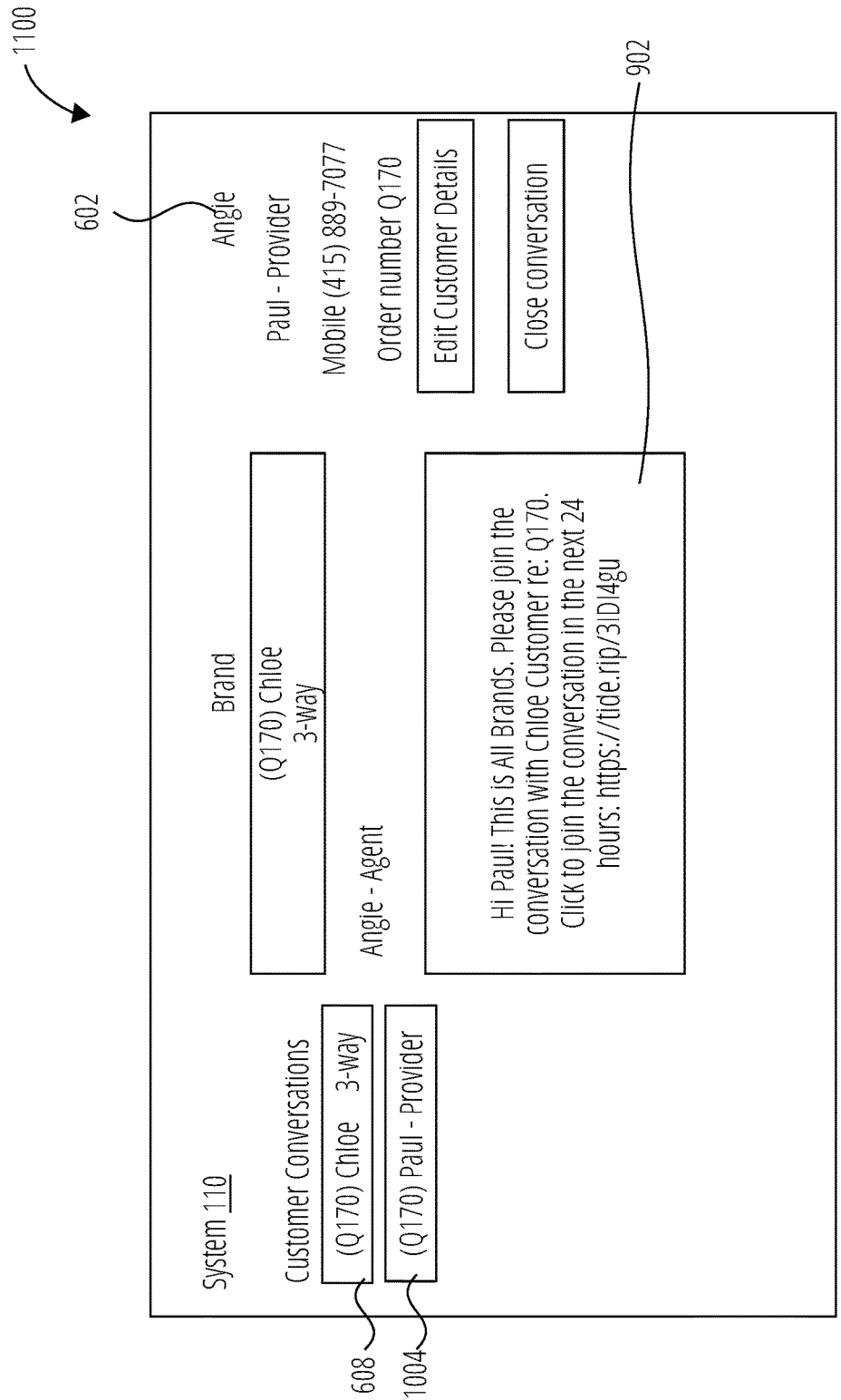
FIG. 11 illustrates a user interface displayed to a network representative upon selecting a conversation with a provider by the network representative, according to an example embodiment.

FIG. 11 illustrates a user interface 1100 displayed to the network representative 602 upon selecting the conversation 1004 with the provider by the network representative 602, according to an example embodiment. The user interface 1100 may display all messages communicated between the network representative 602 and the provider. The messages may include the message 902 sent to the provider by the network representative 602 when inviting the provider. The messages sent by the network representative 602 to the provider within the conversation 1004 may not be shown to the customer in the conversation 608.

Figure 12:
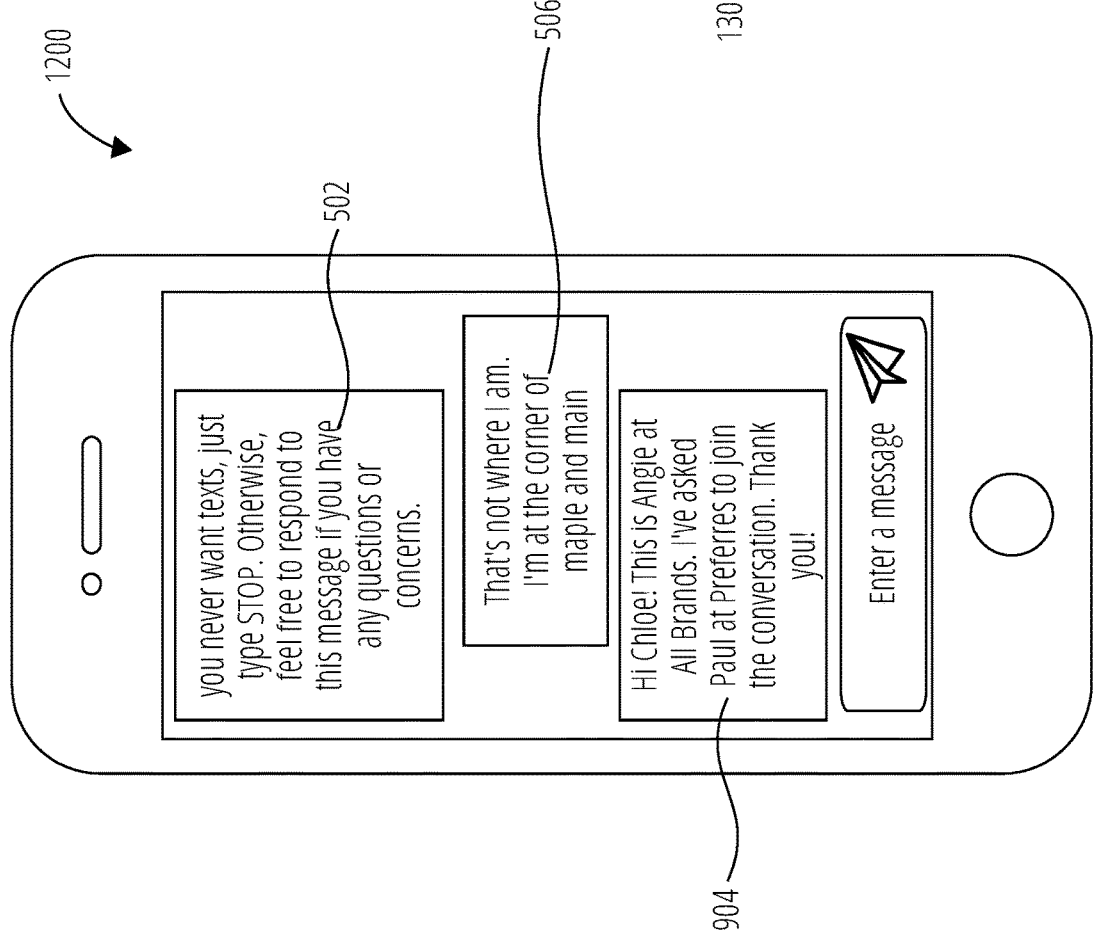
FIG. 12 illustrates a user interface displayed to a customer upon inviting a provider by a network representative, according to an example embodiment.

FIG. 12 illustrates a user interface 1200 displayed to the customer on a user device of the customer upon the network representative 602 inviting the provider, according to an example embodiment. The user interface 1200 may display all messages communicated between the network representative 602 and the customer. The messages may include the message 502 sent to the customer by the network representative 602, the message 506 sent by the customer to the network representative 602, and the message 904 sent to the customer by the network representative 602 upon inviting the provider. All messages may be received by the customer via the SMS.

In an example embodiment, enabling the communications between the provider and the customer may include determining whether the provider has installed a software agent associated with the system 110. If the provider has not installed the software agent, a text message can be sent to the provider (as described with reference to FIG. 13) with a request to accept the request by following a link to a web-based user interface associated with the system 110. The web-based user interface may be dedicated to the communications that can be sent between the providers and the customer.

Figure 13:
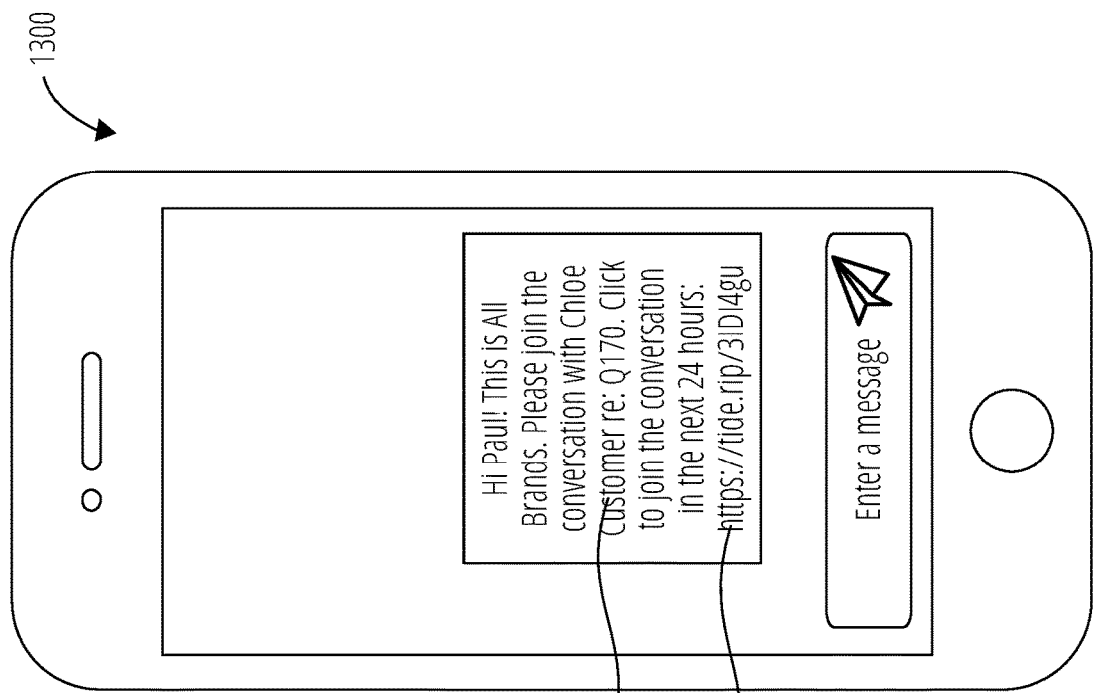
FIG. 13 illustrates a user interface displayed to a provider upon inviting the provider by a network representative, according to an example embodiment.

FIG. 13 illustrates a user interface 1300 displayed to the provider upon the network representative 602 inviting the provider, according to an example embodiment. The user interface 1300 may display the message communicated between the network representative 602 and the provider. The message may include the message 902 sent to the provider by the network representative 602 when inviting the provider. In an example embodiment, the message 902 may be received by the provider via an SMS. The message 902 may have a link 1302 inviting the provider to join a three-way conversation between the customer, the provider, and the network representative.

FIG. 14 illustrates a user interface 1400 displayed to the provider upon the provider opening the link 1302, according to an example embodiment. In an example embodiment, the link 1302 is associated with a web-based user interface of the system 110 and shown as the user interface 1400. The user interface 1400 may enable the provider to send messages to and receive messages from the customer. The user interface 1400 may display to the provider all messages communicated between the network representative 602 and the customer. The messages may include the message 502 sent to the customer by the network representative 602, the message 506 received from the customer by the network representative 602, and the message 904 sent to the customer by the network representative 602 upon inviting the provider.

Upon the provider opening the link 1302, a message 1402 may be sent by the system 110 on behalf of the provider to the customer informing the customer that the provider has joined the conversation between the network representative 602 and the customer.

FIG. 15 illustrates a user interface 1502 displayed to the customer upon the provider opening the link 1302 and joining the conversation, according to an example embodiment. After the provider joins the conversation, the message 1402 may be automatically sent to the customer to notify the customer that the provider has joined the conversation between the customer and the network representative. Therefore, the message 1402 may in fact notify the customer that the two-party conversation 608 between the customer and the network representative 602 has become a three-party conversation 608 between the customer, the network representative 602, and the provider. In general, upon any further party joining the conversation 608, the system 110 may notify all the participants about the new participant by sending a corresponding message to all participants of the conversation 608.

To enable the customer to see which messages are sent by the system 110 and which messages are sent by which party, the system 110 may add an identifier to the messages to discern who is sending the message. In particular, the system 110 may add an identifier 1504 to the message 1402. The identifier 1504 may include, for example, brackets, a name of the party that sent the message, and the like. The system 110 may use square brackets for identifying messages automatically sent by the system 110 and round brackets for identifying parties that sent the messages.

Thus, the whole service transaction occurs without participation by the network representative 602 once the customer and the provider start communicating directly.

In an example embodiment, the network representative 602 may include an AI bot configured to send predetermined messages (e.g., an initial response on behalf of a provider) to the customer and select and add providers to the conversation with the customer. The AI bot may be controlled by the AI unit 206 shown in FIG. 2 according to predetermined rules. For example, any time the customer sends in a message, the AI bot may automatically start a three-way conversation between the customer, the provider, and the AI bot.

Figures 16, 17:
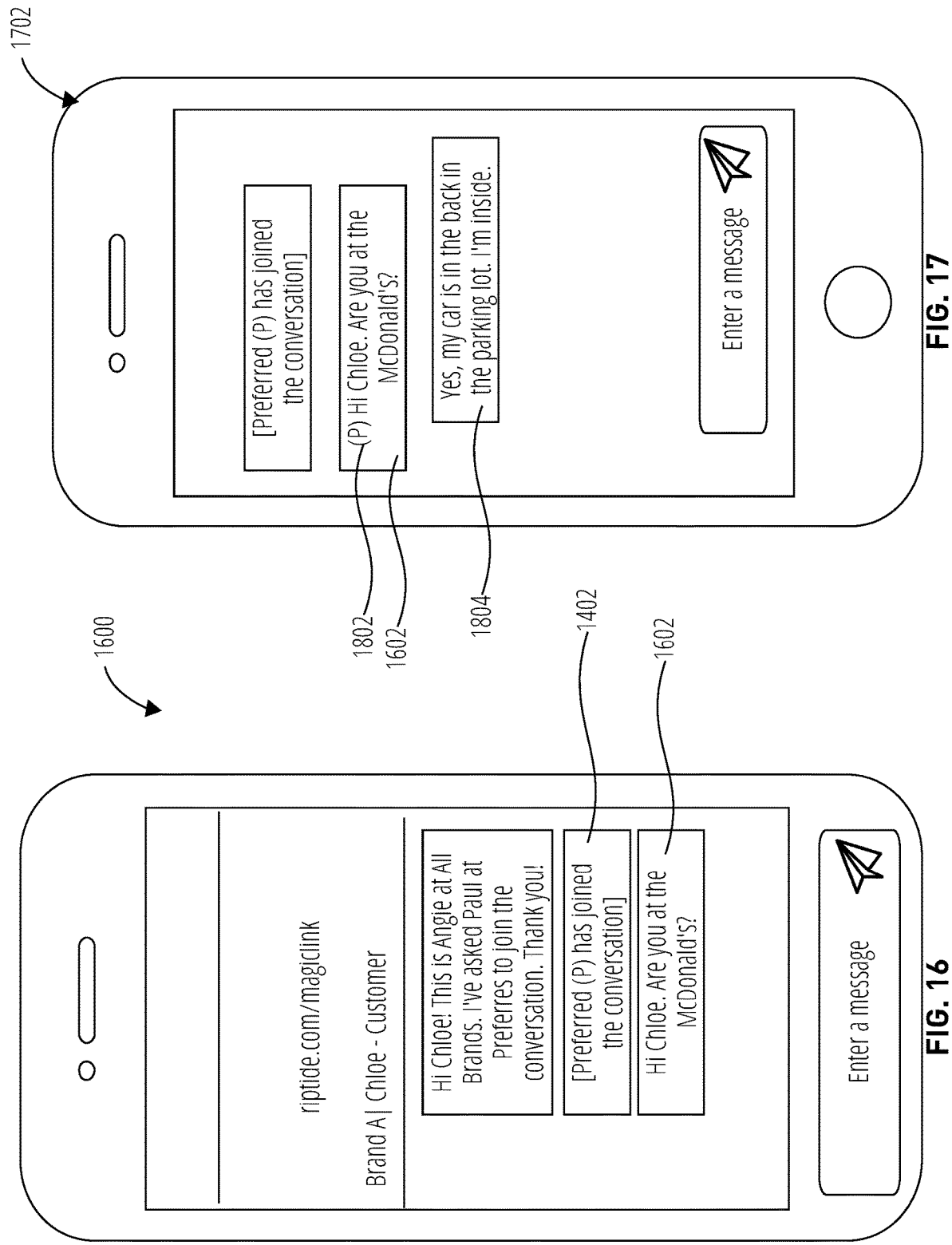
FIG. 16 illustrates a user interface displayed to a provider upon opening a link, according to an example embodiment.
FIG. 17 illustrates a user interface displayed to a customer upon receiving a message from a provider by the customer, according to an example embodiment.

FIG. 16 illustrates a user interface 1600 displayed to the provider upon the provider opening the link 1302, according to an example embodiment. The provider may use the user interface 1600 to send messages to the customer. For example, the provider may send a message 1602 to the customer to ask the customer some questions related to the service, such as the current location of the customer. In general, upon joining the conversation 608 by any further party, the system 110 may notify all the participants about the new participant by sending a corresponding message to all participants of the conversation 608.

FIG. 17 illustrates a user interface 1702 displayed to the customer upon the customer receiving the message 1602 from the provider, according to an example embodiment. The message 1602 may have an identifier 1802 to show the customer a party by which the message 1602 was sent. The identifier 1802 may include, for example, a first letter "P" of the name of the provider taken in round brackets, (P).

The customer may use the user interface 1702 to send a message 1804 to the provider. The message 1804 may include additional metadata related to the customer and the service, such as a current location of the customer.

FIG. 18 illustrates a user interface 1800 displayed to the provider upon the provider receiving the message 1804 from the customer, according to an example embodiment. The user interface 1800 may show the message 1804 and may enable the provider to reply to the customer, e.g., by sending a message 1806. In the message 1806, the provider may provide some information related to the service to be provided by the provider.

FIG. 19 illustrates a user interface 1900 displayed to the customer upon the customer receiving the message 1806 from the provider, according to an example embodiment. The message 1806 may be displayed with the identifier 1802 (P) to notify the customer that the message 1806 was sent by the provider and not by any other participant of the conversation. The customer may reply to the provider by sending a message 1902.

Figure 20:
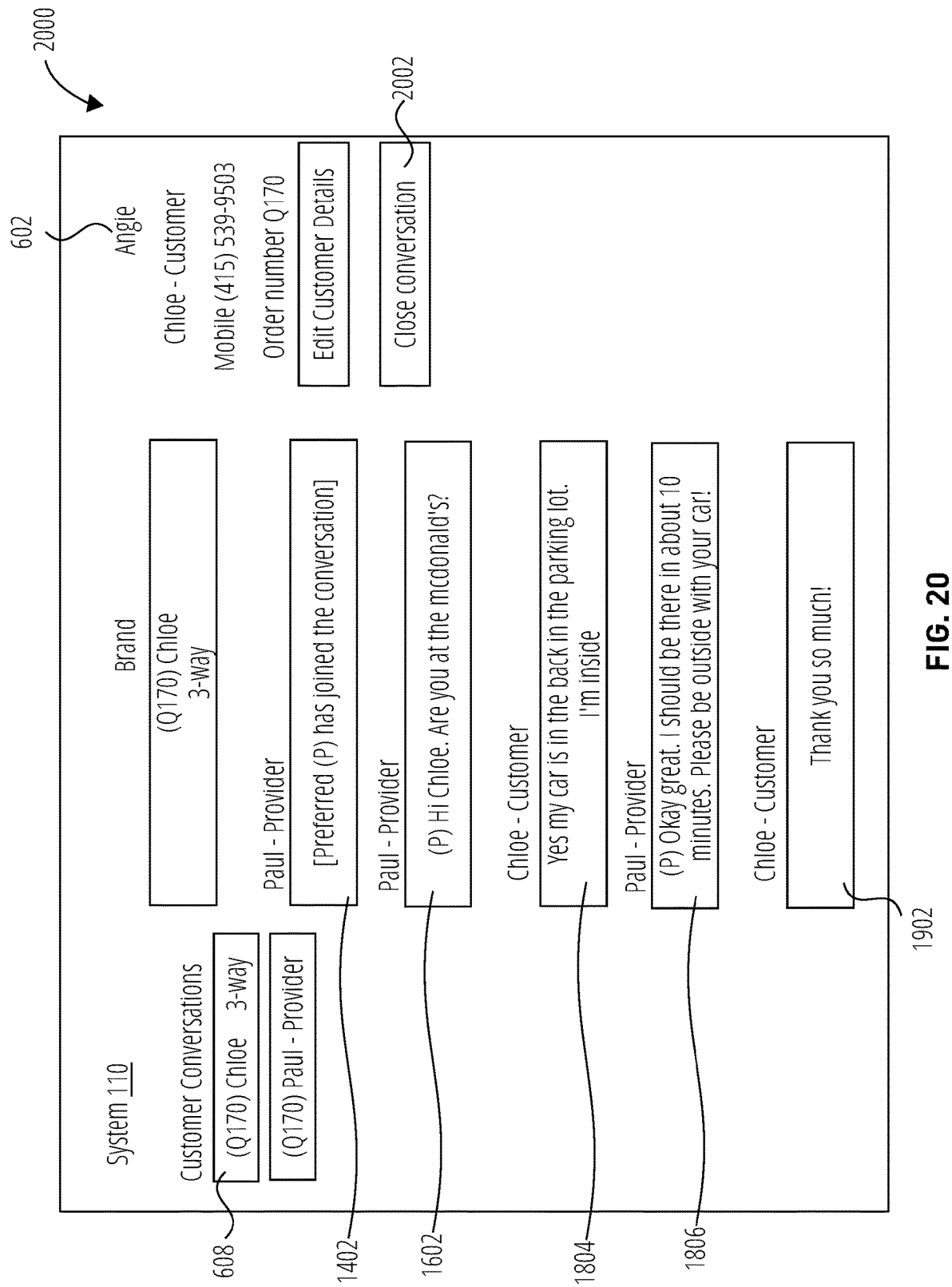
FIG. 20 illustrates a user interface displayed to a network representative upon joining a conversation between the network representative and a customer, according to an example embodiment.

FIG. 20 illustrates a user interface 2000 displayed to the network representative 602 upon the provider joining the conversation 608 between the network representative 602 and the customer, according to an example embodiment. Upon selecting the conversation 608 by the network representative 602, the user interface 2000 may display all messages communicated between the provider and the customer. The messages may include a message 1402 automatically sent by the system 110 upon joining the conversation 608 by the provider, messages 1602 and 1806 sent by the provider to the customer, and messages 1804 and 1902 sent by the customer to the provider. Therefore, the network representative 602 may review all messages communicated between the provider and the customer in the three-way conversation 608.

The user interface 2000 further has a close conversation icon 2002 enabling the network representative 602 to close the conversation 608.

Figure 21:
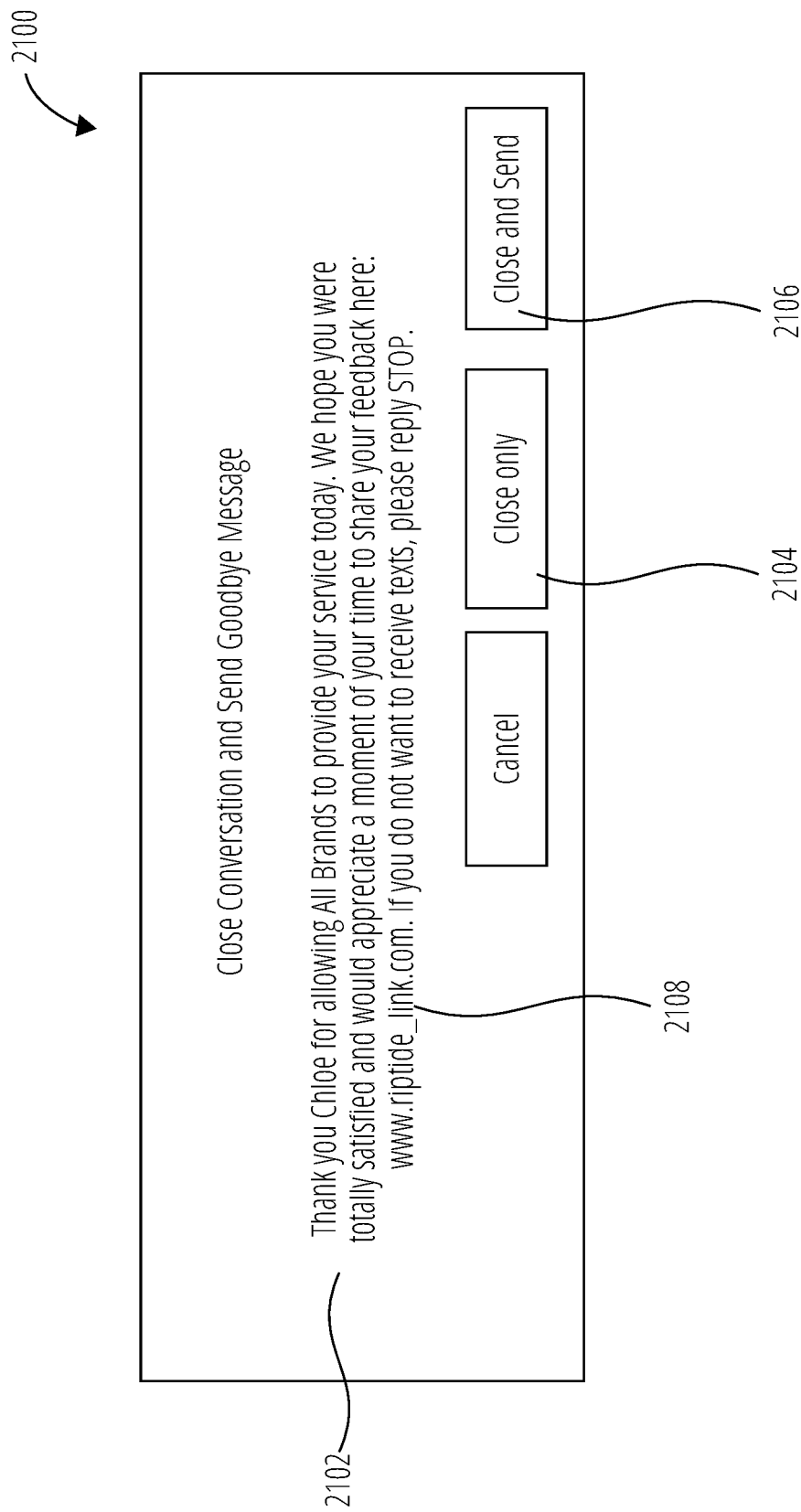
FIG. 21 illustrates a user interface shown to a network representative upon the network representative clicking a close conversation icon, according to an example embodiment.

FIG. 21 illustrates a user interface 2100 shown to the network representative 602 upon clicking the close conversation icon 2002 by the network representative 602, according to an example embodiment. Upon clicking the close conversation icon 2002, a message 2102 to be sent to the customer on behalf of the network representative 602 may be shown to the network representative 602. The message 2102 may be a good bye message to the customer upon finishing the conversation 608. The network representative 602 may select between closing the conversation 608 without sending the message 2102 (an icon 2104) and closing the conversation 608 along with sending the message 2102 (an icon 2106).

In an example embodiment, the message 2102 may include a link 2108 to a customer satisfaction survey and an invitation for the customer to answer questions in the customer satisfaction survey.

FIG. 22 is a user interface 2200 shown to the customer upon the network representative 602 closing the conversation 608, according to an example embodiment. Upon the network representative 602 closing the conversation 608, the provider may be removed from the conversation 608 and a message 2202 may be automatically sent by the system 110 to the customer to notify the customer that the provider has left the conversation 608. Therefore, upon the network representative 602 closing the conversation 608, the conversation 608 becomes again a two-party conversation between the network representative 602 and the customer.

FIG. 23 is a user interface 2300 shown to the customer upon the network representative 602 closing the conversation 608, according to an example embodiment. The message 2102 with the link 2108 to the customer satisfaction survey may be sent in the conversation 608 by the network representative 602 to the customer. The user interface 2300 may show the message 2102 with the link 2108 to the customer satisfaction survey. Moreover, as the conversation 608 is now the two-party conversation between the network representative 602 and the customer, the customer may provide any information about the provider to the network representative 602 and know that this information is unavailable to the provider.

The system of the present disclosure may support alternative shopping scenarios, in which the system may be configured to start simultaneously conversations with as many providers as a customer wants. The shopping scenario refers to enabling the user to review a plurality of providers and select one or more providers from a plurality of providers. In the shopping scenario, the customer is basically shopping for the service to be provided by the selected one or more providers. FIGS. 24-38 illustrate the use of the system 110 in the shopping scenario.

FIG. 24 is a user interface 2400 illustrating use of the system 110 in a shopping scenario, according to an example embodiment. A customer may visit a website 2402 associated with a user interface 2400 of a brand (i.e., a marketplace). The system 110 may be connected to the website 2402 of the brand via an API. The customer may select a service 2404 from a list of services and select a provider 2406 from a list of available providers that provide services on behalf of the brand.

FIG. 25 is a user interface 2500 illustrating selection of a provider by the customer, according to an example embodiment. A drop-down menu 2502 may be provided to the customer on the user interface 2500 to enable the customer to select any of the providers, select a particular provider, or select all providers simultaneously. Therefore, the system 110 enables the customer to start conversations with as many providers as the customer wants simultaneously.

In an embodiment, when the customer selects multiple or all providers, the system 110 automatically provisions phone numbers associated with each of the selected providers and automatically starts conversations between the customer and the selected providers. The customer may receive messages associated with the conversation via the SMS. Each one of the conversations the customer is having with a different provider may be on a different phone number assigned to the provider.

In an example embodiment, the customer provides a request for the service, such as "Hey, I have a radiator that needs to be fixed. How much do you charge and can you get it fixed next Wednesday?" The system 110 receives the request and sends the request to several different providers (e.g., repair shops). All providers respond to the service request simultaneously. The system 110 receives the responses of the providers and uses the phone numbers in control of the system 110 and assigned by the system 110 to the providers to establish multiparty conversations between the customer and each of the providers. A network representative of the SDN may also have access to the multiparty conversations to review the multiparty conversations.

Figure 26:
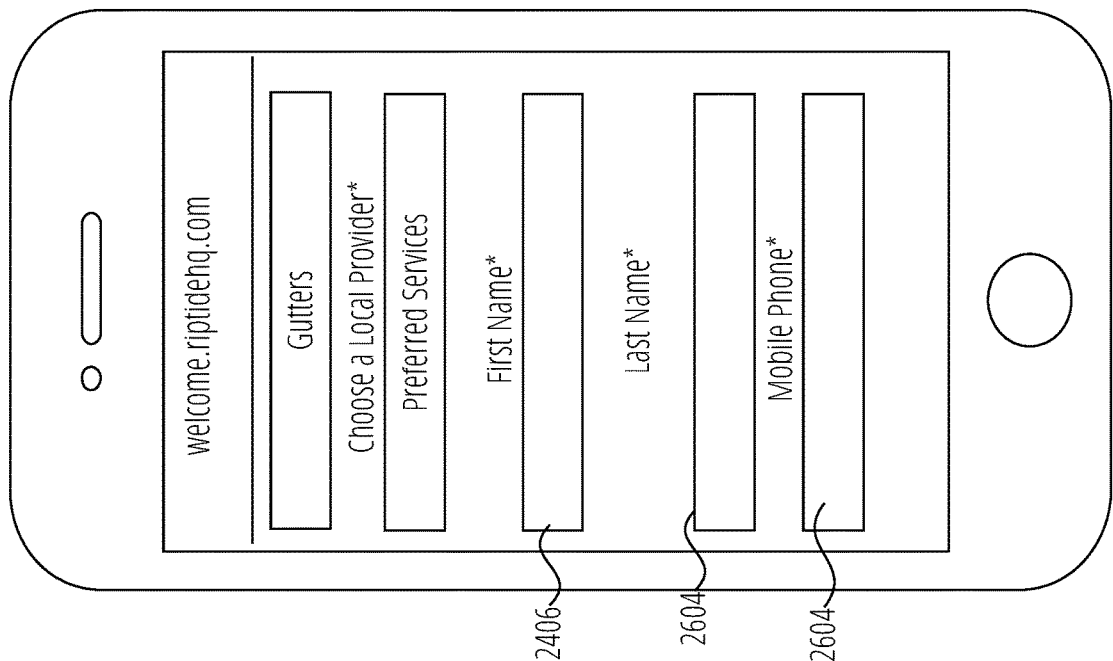
FIG. 26 shows a user interface illustrating a customer providing metadata, according to an example embodiment.

FIG. 26 shows a user interface 2602 illustrating the customer providing metadata, according to an example embodiment. Upon selection of the provider, the customer may provide metadata 2604 related to the service or the customer. The metadata 2604 may include a name of the customer, a phone number of the customer, and so forth.

Figure 27:
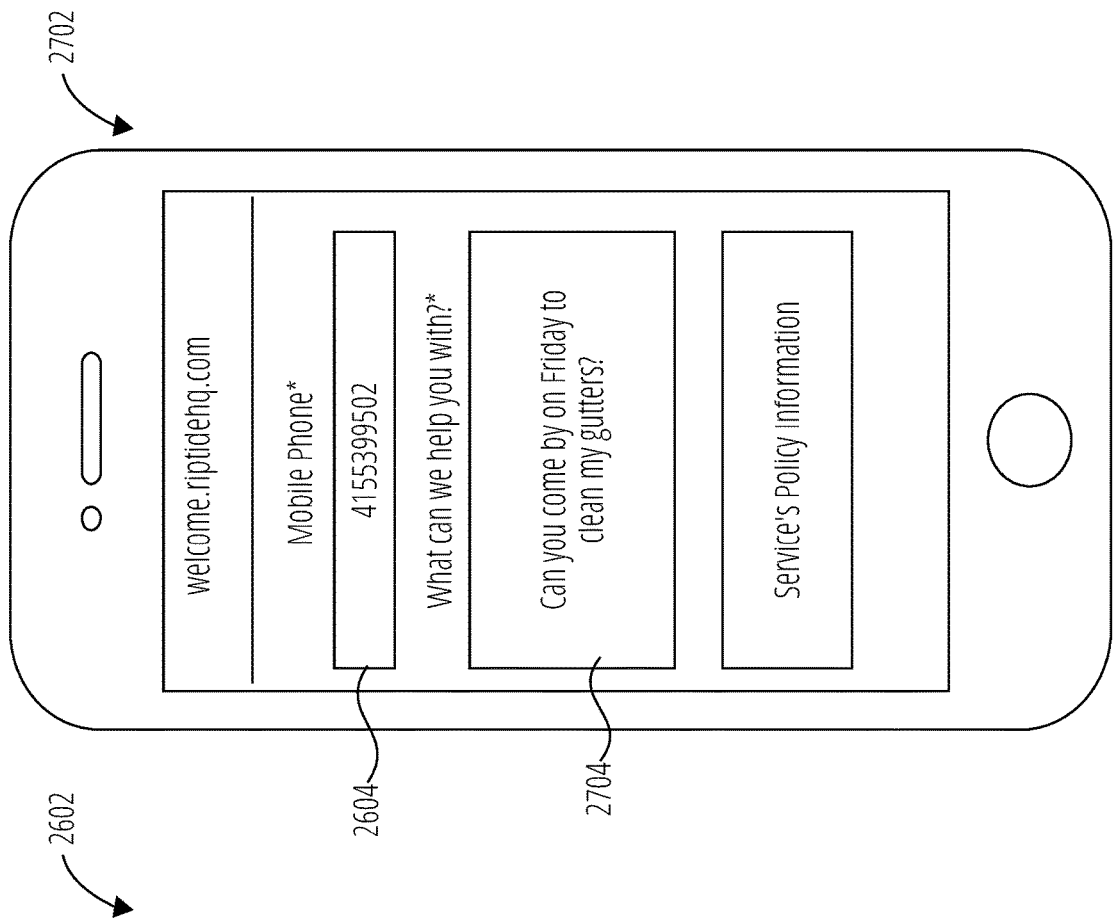
FIG. 27 shows a user interface illustrating a customer providing further metadata, according to an example embodiment.

FIG. 27 shows a user interface 2702 illustrating the customer providing further metadata, according to an example embodiment. The further metadata 2704 may include additional information related to the service, such as, e.g., description of the service, a price, a date, time, and the like.

Figure 28:
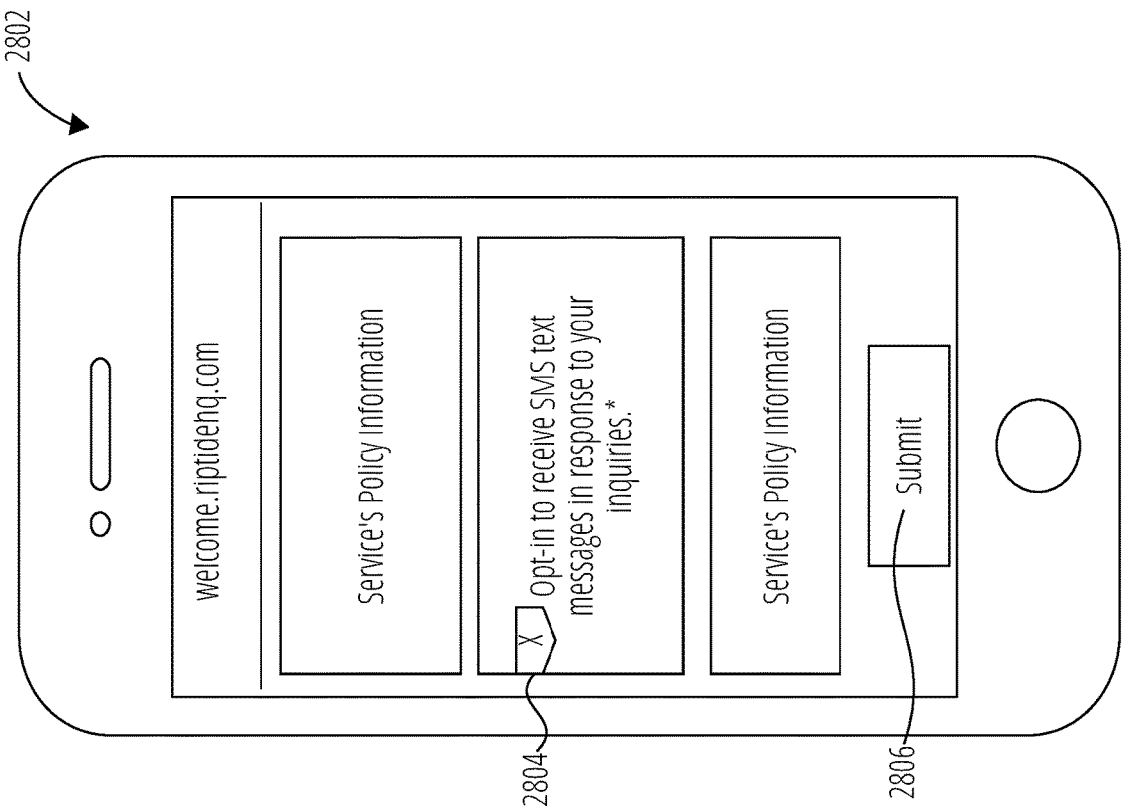
FIG. 28 shows a user interface illustrating providing an agreement by a customer to receive text messages, according to an example embodiment.

FIG. 28 shows a user interface 2802 illustrating the customer providing an agreement to receive text messages, according to an example embodiment. The customer may select a check box 2804 if the customer agrees to receive text messages via the SMS in response to the request for service made by the customer via the user interface 2500. Upon filling in all the fields, the customer may click a submit icon 2806.

Figure 29:
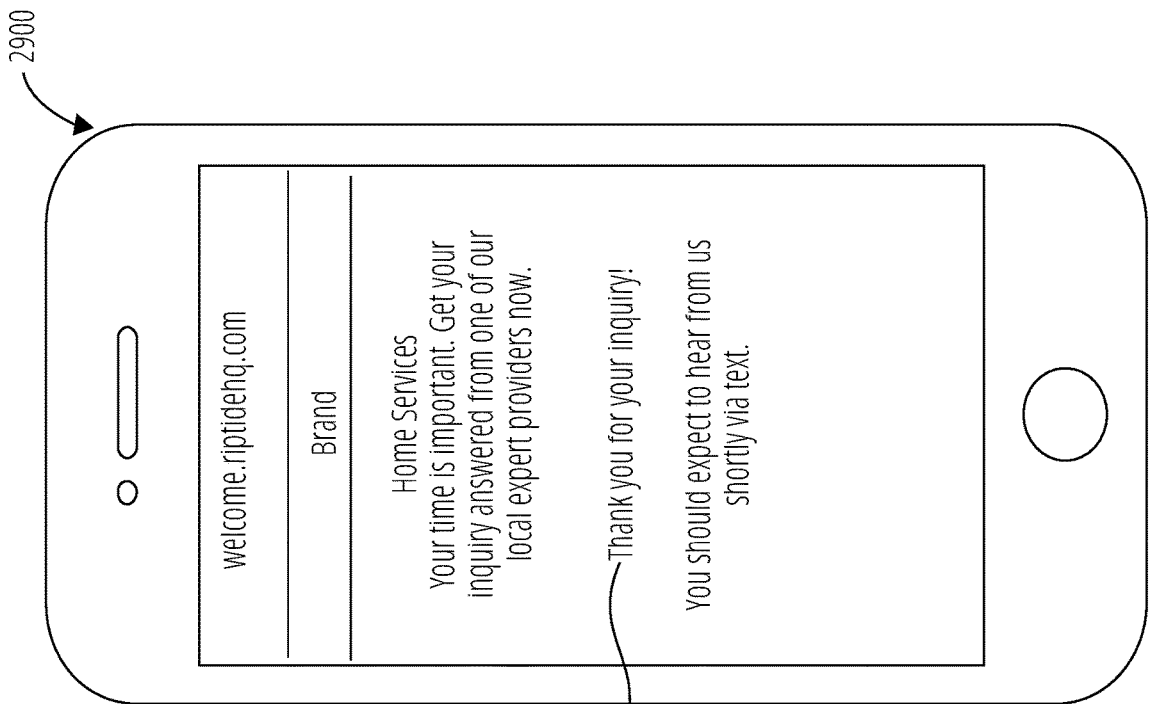
FIG. 29 shows a user interface provided to a customer upon clicking a submit icon, according to an example embodiment.

FIG. 29 shows a user interface 2900 provided to the customer upon clicking the submit icon 2806, according to an example embodiment. The user interface 2900 may show a confirmation 2902 confirming that the request for the service has been received and that a text message will be provided via the SMS to the customer.

Upon receiving the request for the service, the website of the brand may make a call to the system 110 to start a multiparty conversation between the customer, a network representative associated with the brand, and the provider.

FIG. 30 shows a user interface 3000 displayed on a user device of the customer, according to an example embodiment. The system 110 may send a message 3002 to the customer informing the customer that the request for the service has been received by the system 110 and that the provider selected by the customer has been invited to join the multiparty conversation with the customer. The message 3002 may be labeled with an identifier 3004 to show that the message 3002 was received from the network representative and not from any other party of the multiparty communication channel.

FIG. 31 shows the user interface 3102 used by the customer for sending messages, according to an example embodiment. The customer may send a message 3104 to the network representative with additional information (i.e., the additional metadata) related to the service. The message 3104 may be sent by the user device via the SMS.

Figure 32:
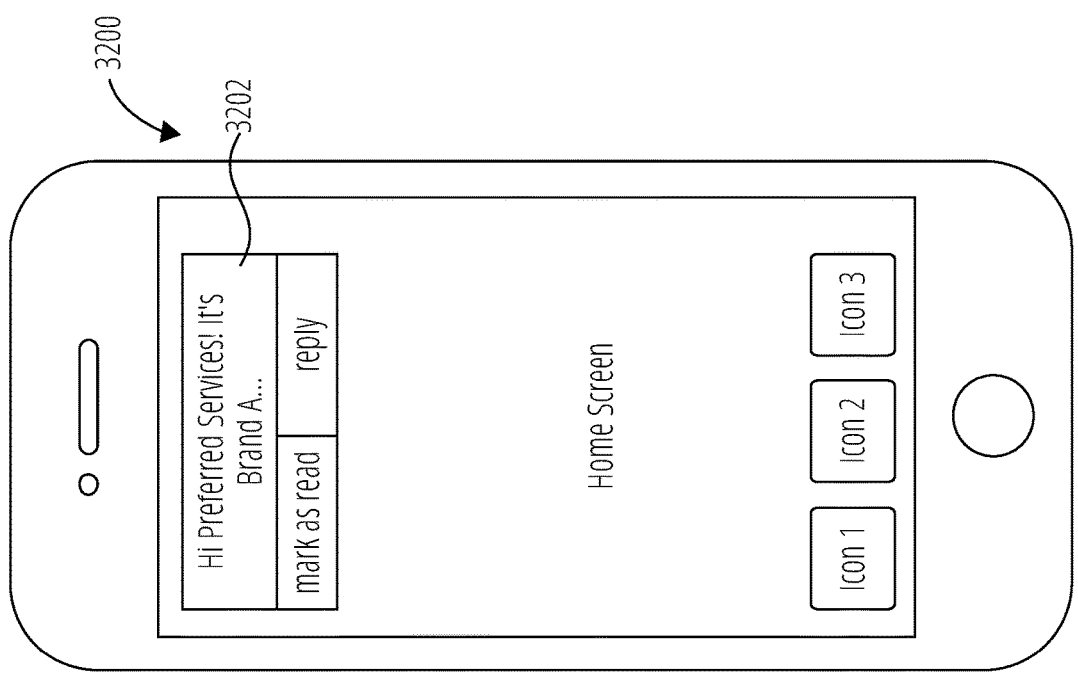
FIG. 32 illustrates a user interface provided by a user device of a provider, according to an example embodiment.

FIG. 32 illustrates a user interface 3200 provided by a user device of the provider, according to an example embodiment. The provider may receive a notification 3202 informing that a message has been received from the system 110. In an example embodiment, the message may be received by the provider via the SMS.

Figure 33:
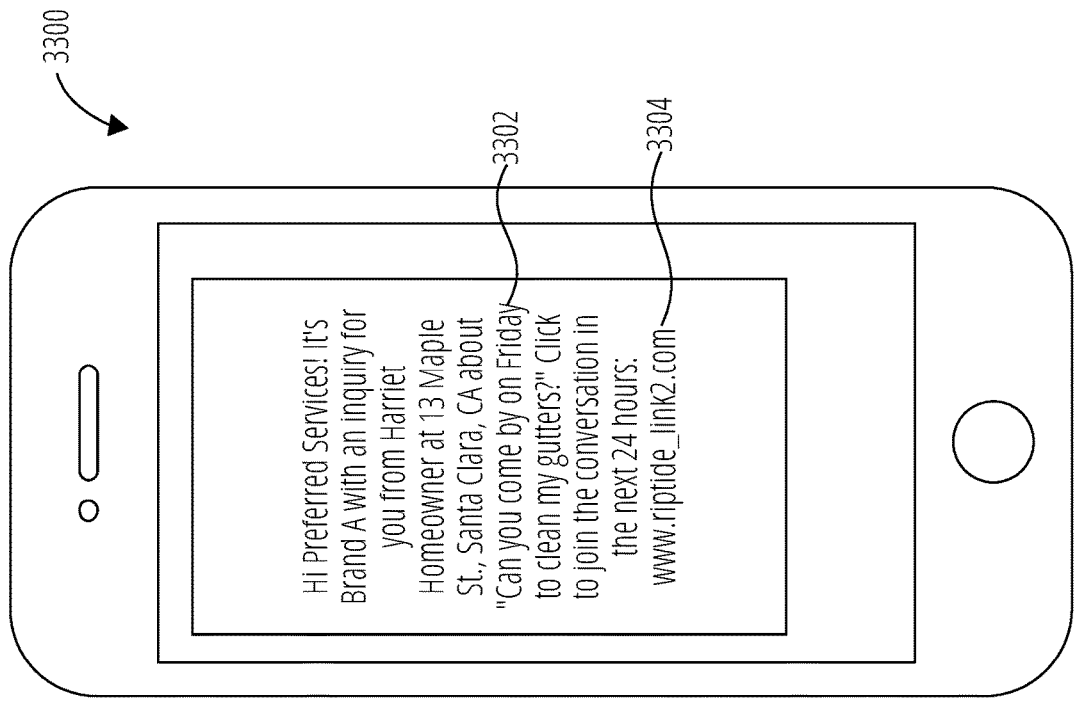
FIG. 33 illustrates a user interface displayed to a provider upon a network representative inviting the provider to join a multiparty conversation with a customer, according to an example embodiment.

FIG. 33 illustrates a user interface 3300 displayed to the provider upon the network representative inviting the provider to join the multiparty conversation with the customer, according to an example embodiment. The user interface 3300 may display a message 3302 communicated by the network representative to the provider. The message 3302 may be received by the provider via the SMS. The message 3302 may have a link 3304 inviting the provider to join the multiparty conversation between the customer, the provider, and the network representative. Upon following the link 3304, the user interface 3400 shown in FIG. 34 may be provided to the provider. The message 3302 may further include metadata related to the service and the customer.

In an example embodiment, enabling the communications between the provider and the customer may include determining whether the provider has installed a software agent associated with the system 110 of the present disclosure. If the provider has not installed the software agent, a text message can be sent to the provider (as described with reference to FIG. 34) with a request to accept the request by following a link to a web-based user interface associated with the system 110. The web-based user interface may be dedicated to the communications that can be sent between the provider and the customer.

Figure 34:
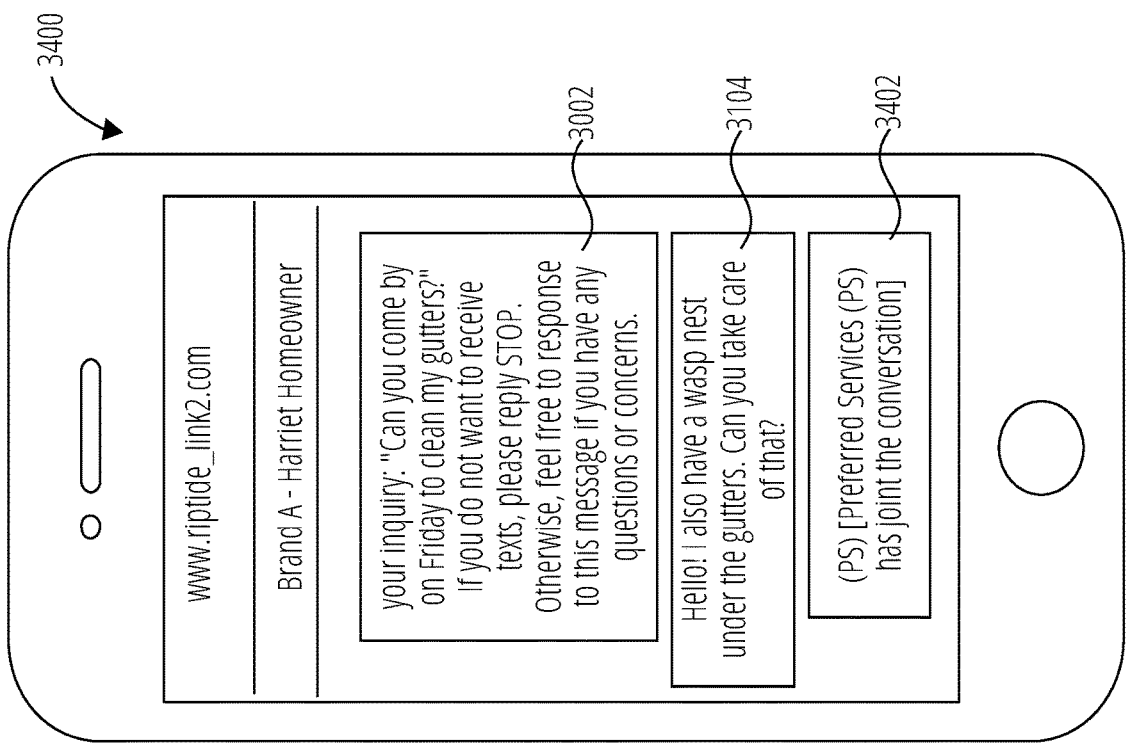
FIG. 34 shows a user interface displayed to a provider upon the provider following a link, according to an example embodiment.

FIG. 34 shows a user interface 3400 displayed to the provider upon following the link 3304 by the provider, according to an example embodiment. The user interface 3400 may display all messages sent in the multiparty conversation such as the message 3002 sent by the network representative to the customer and the message 3104 sent by the customer to the network representative. Moreover, upon the provider joining the multiparty conversation, a message 3402 may be automatically sent to the customer to notify the customer that the provider has joined the multiparty communication channel.

Figure 35:
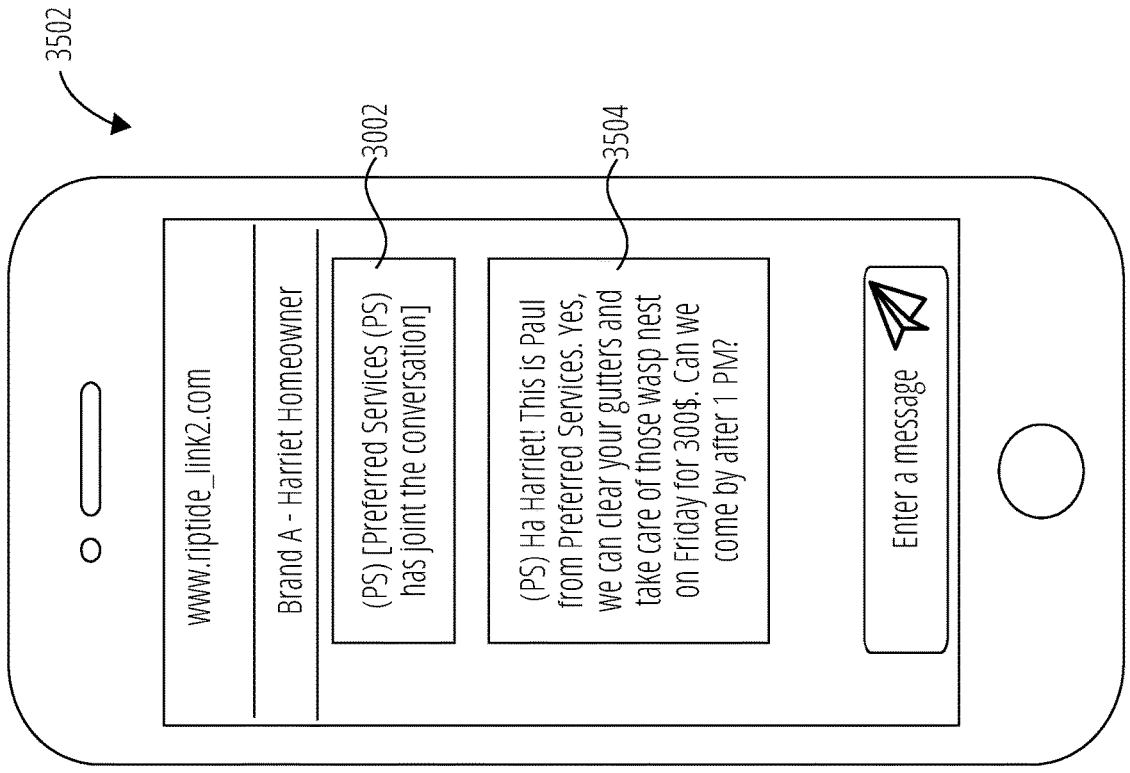
FIG. 35 shows the user interface used by a provider for sending messages to a customer, according to an example embodiment.

FIG. 35 shows the user interface 3502 used by the provider for sending messages to the customer, according to an example embodiment. The provider may send a message 3504 to the customer to provide the information on the service and ask questions, if needed.

Figure 36:
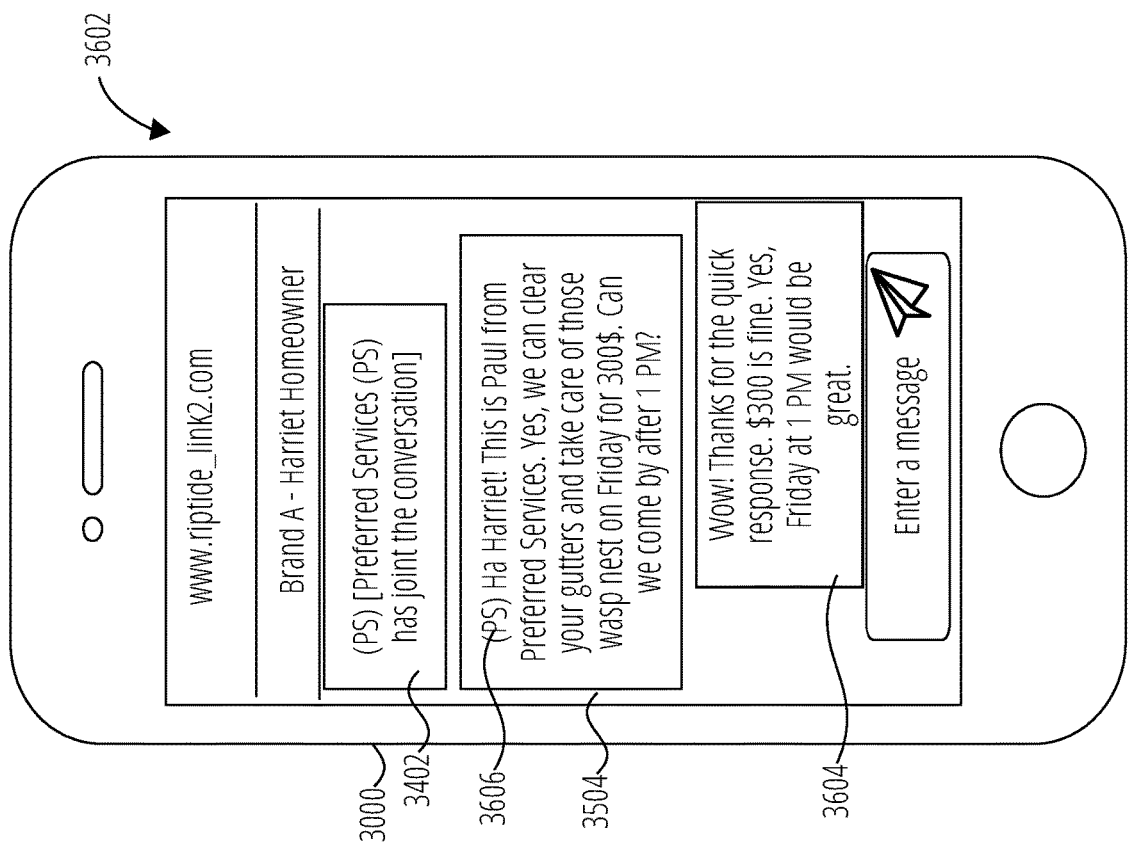
FIG. 36 shows the user interface shown on a user device of a customer, according to an example embodiment.

FIG. 36 shows the user interface 3602 shown on the user device of the customer, according to an example embodiment. The user interface 3602 may show the message 3402 automatically sent to the customer upon the provider joining the multiparty conversation and the message 3504 sent by the provider to the customer. The customer may use the user interface 3602 to send messages to the provider. In particular, the customer may send a message 3604 to reply to the message 3504 of the provider. An identifier 3606 may be added to all messages sent by the provider to distinguish the provider from other parties sending messages in the multiparty conversation.

Figure 37:
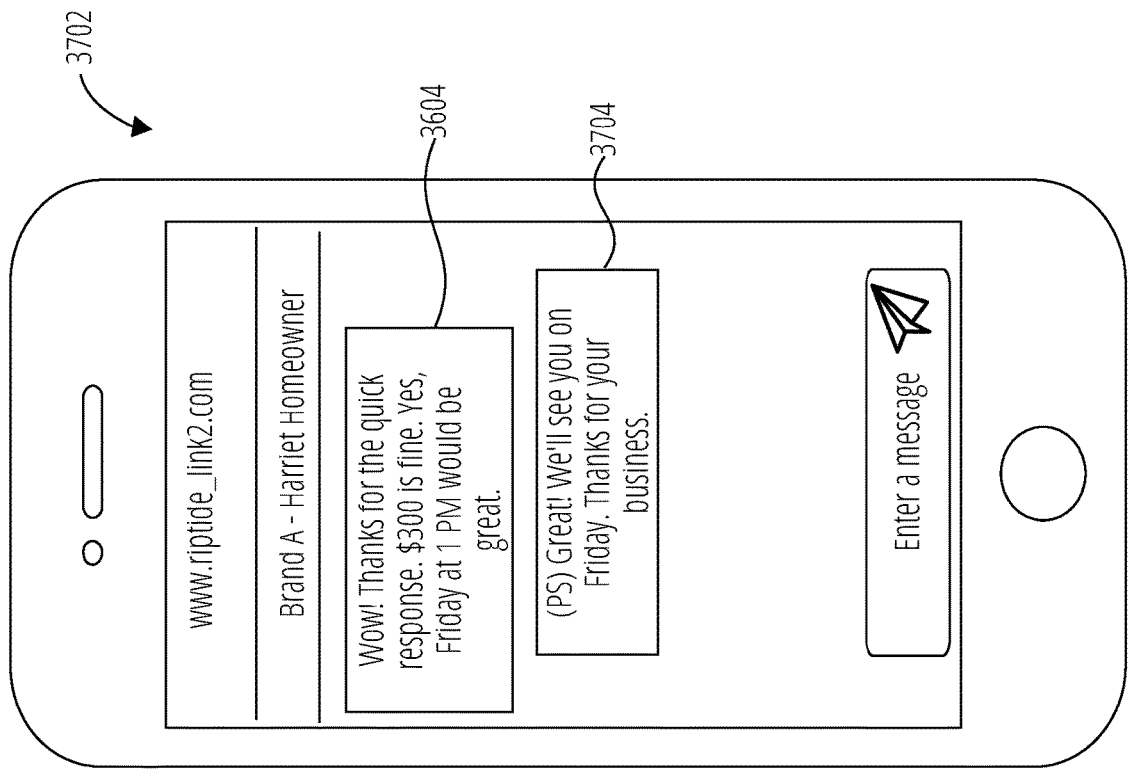
FIG. 37 shows the user interface provided to a provider for sending messages to a customer, according to an example embodiment.

FIG. 37 shows the user interface 3702 provided to the provider for sending messages to the customer, according to an example embodiment. The provider may send a message 3704 to the customer to reply to the message 3604 received by the provider from the customer.

Figure 38:
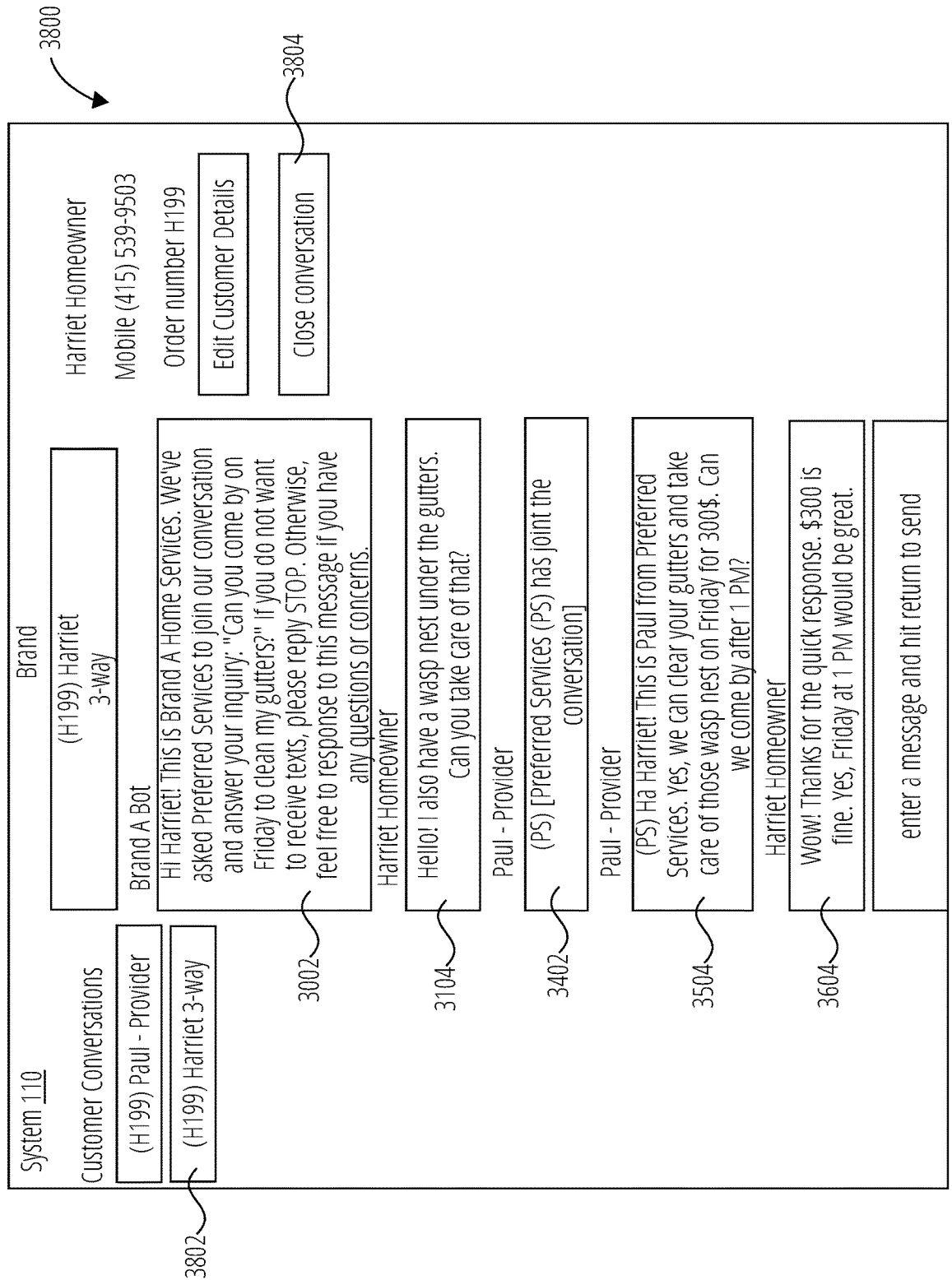
FIG. 38 illustrates a user interface displayed to a network representative upon joining a multiparty conversation between the network representative and a customer, according to an example embodiment.

FIG. 38 illustrates a user interface 3800 displayed to the network representative upon the provider joining the multiparty conversation between the network representative and the customer, according to an example embodiment. Upon the network representative selecting a conversation 3802, the user interface 3800 may display all messages communicated between the network representative, the provider, and the customer. The messages may include the message 3002 sent by the network representative to the customer, the message 3104 sent by the customer to the network representative, the message 3402 automatically sent by the system 110 to the customer upon the provider joining the conversation 3802, the message 3504 sent by the provider to the customer, and the message 3604 sent by the customer to the provider. Therefore, the network representative may review all messages communicated between the provider and the customer in the conversation 3802.

The user interface 3800 may further have a close conversation icon 3804 to enable the network representative to close the conversation 3802 upon provisioning of the service by the provider to the customer.

Even after the conversation 3802 is closed, the customer may use the user interface 3000 any time later to provide any further details on the service or provide the feedback. The messages sent by the customer via the SMS using the user interface 3000 may be received by the system 110. Upon receiving the messages from the customer, the system 110 may reopen the conversation 3802 between the network representative and the customer.

Figure 39:
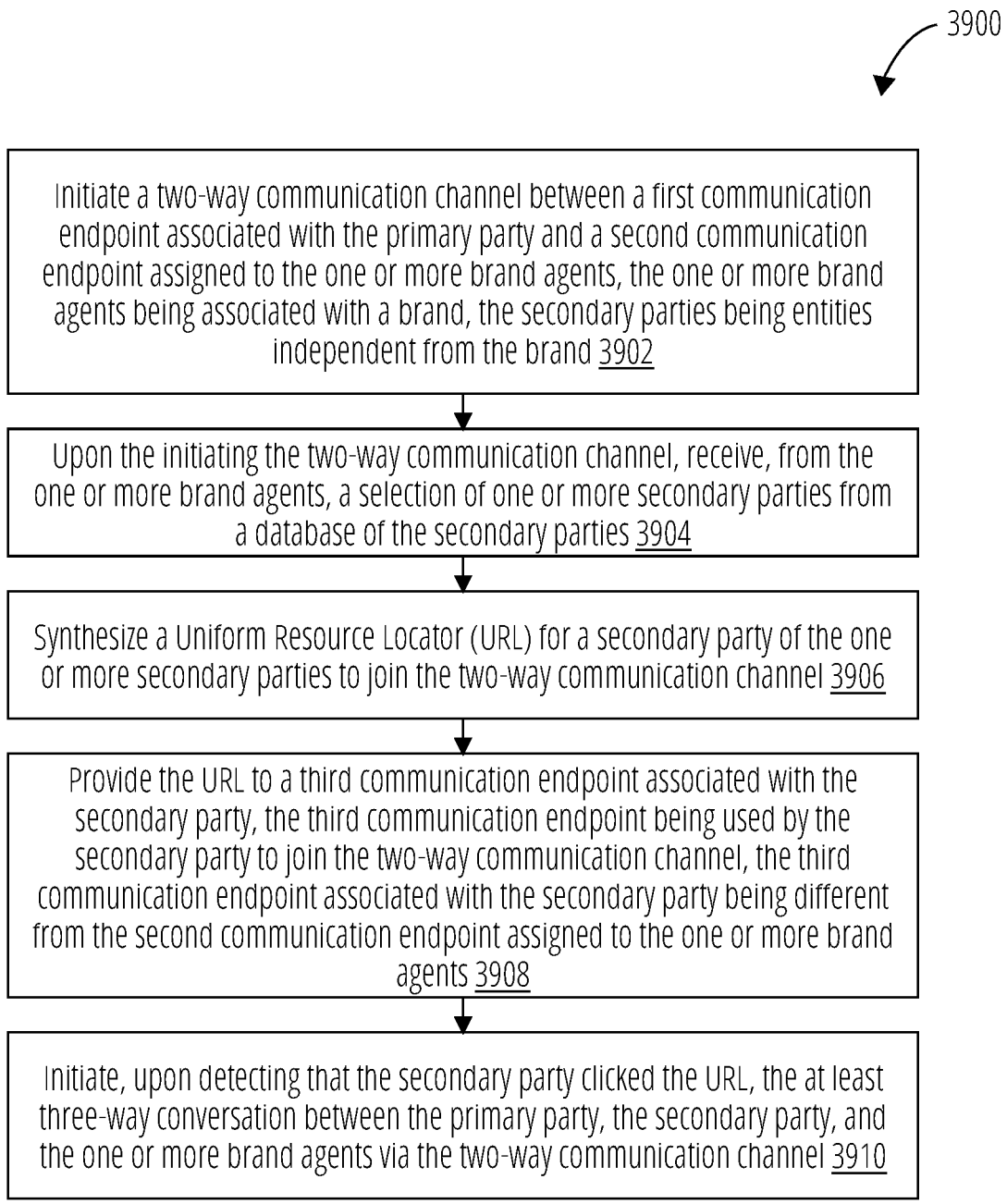
FIG. 39 illustrates a method for establishing at least three-way conversation between a primary party, secondary parties, and one or more brand agents within an SDN, according to an example embodiment.

FIG. 39 is a flow chart of a method 3900 for establishing at least three-way conversation between a primary party, secondary parties, and one or more brand agents within an SDN, according to an example embodiment. In some embodiments, the operations may be combined, performed in parallel, or performed in a different order. The method 3900 may also include additional or fewer operations than those illustrated. The method 3900 may be performed by processing logic that may comprise hardware (e.g., decision making logic, dedicated logic, programmable logic, and microcode), software (such as software run on a general-purpose computer system or a dedicated machine), or a combination of both.

The method 3900 may commence in block 3902 with initiating a two-way communication channel between a first communication endpoint associated with the primary party and a second communication endpoint assigned to the one or more brand agents. The one or more brand agents may be associated with a brand and the secondary parties may be entities independent from the brand.

In block 3904, the method 3900 may proceed with receiving, from the one or more brand agents and upon the initiating the two-way communication channel, a selection of one or more secondary parties from a database of the secondary parties.

In an example embodiment, upon the receiving the selection of the one or more secondary parties from the database, the method 3900 may proceed with simultaneously starting a communication channel between the one or more brand agents and each of the one or more secondary parties. The method 3900 may further include providing, via the communication channel, metadata associated with the primary party to the one or more secondary parties and receiving a feedback from the one or more secondary parties. The method 3900 may further include enabling, based on the feedback received from the one or more secondary parties, the primary party to inquire for information associated with the one or more secondary parties. Upon providing the information received from the one or more secondary parties to the primary party, the method 3900 may proceed with enabling the primary party to select the secondary party from the one or more secondary parties.

In block 3906, the method 3900 may include synthesizing a URL for a secondary party of the one or more secondary parties to join the two-way communication channel.

In block 3908, the method 3900 may proceed with providing the URL to a third communication endpoint associated with the secondary party. The third communication endpoint may be used by the secondary party to join the two-way communication channel. The third communication endpoint associated with the secondary party may be different from the second communication endpoint assigned to the one or more brand agents.

The URL may be shared by the one or more brand agents with the secondary party via an SMS message sent to the secondary party. The SMS message may be synthesized using metadata associated with the primary party and metadata associated with a service. The secondary party may be responsible for the service.

In block 3910, the method 3900 may include initiating, upon detecting that the secondary party clicked the URL, the at least three-way conversation between the primary party, the secondary party, and the one or more brand agents via the two-way communication channel. The primary party may communicate with the one or more brand agents and the secondary party via an SMS between a phone number of the primary party and a phone number provisioned by the brand and associated with the secondary party. Messages sent by the secondary party to the primary party may be received by the brand and sent by the brand from the phone number provisioned by the brand and associated with the secondary party to the phone number of the primary party.

In an example embodiment, messages sent in the at least three-way conversation may include pre-defined templated messages having parameters partially or fully completed before the messages are sent. The pre-defined templated messages may be generated using metadata associated with one or more of the brand, the primary party, the secondary parties, and a service for which the brand, the primary party, and the secondary parties are engaged. The pre-defined template messages may be categorized by a role. A party associated with the role may be enabled to see the pre-defined template messages associated with the role.

In an example embodiment, the initiating the two-way communication channel between the one or more brand agents and the primary party may include sending messages over an interprocess communication channel. The primary party may be enabled to choose to switch the two-way communication channel to an SMS channel or a further channel. The primary party may be enabled to switch back to the interprocess communication channel or the further channel. A plurality of at least three-way conversations may continue after choosing, by the primary party, any of the two-way communication channel, the SMS channel, and the further channel to communicate.

In an example embodiment, the URL may be temporary and may expire within a predetermined time to limit the time when the secondary party is enabled to join the at least three-way conversation.

In an example embodiment, the method 3900 may further include receiving, from the primary party, a selection of one or more further secondary parties from the one or more secondary parties. The method 3900 may proceed with enabling the brand, based on the selection, to provision individual phone numbers associated with the further secondary parties. The method 3900 may further proceed with initiating further at least three-way conversations between the primary party, the one or more brand agents, and each of the further secondary parties via the two-way communication channel. The primary party and the further secondary parties may communicate via the SMS between a phone number of the primary party and the individual phone numbers provisioned for the further secondary parties.

In an example embodiment, the method 3900 may further include enabling the one or more brand agents to communicate through the two-way communication channel via an application. The application may enable the one or more brand agents to monitor, review, participate in, and manage adding and dropping of parties to the at least three-way conversation between the primary party and the secondary parties. The application may include one of the following: a standalone application and an application embedded within a further application in use by the one or more brand agents.

In an example embodiment, the method 3900 may further include labelling messages sent in the at least three-way conversation to indicate, to the primary party, the secondary party or the one or more brand agents sending the messages. The labels may be automatically synthesized based on metadata associated with the secondary party and metadata associated with the brand.

In an example embodiment, the method 3900 may further include announcing the joining of the secondary party with an announcement message. The announcement message may be synthesized based on metadata associated with the secondary party, thereby indicating, to the primary party, that the secondary party is present in the at least three-way conversation.

In an example embodiment, the method 3900 may further include enabling the one or more brand agents and the secondary parties to annotate the at least three-way conversation and share notes. The notes may be invisible to the primary party.

In an example embodiment, the method 3900 may further include enabling the one or more brand agents to drop the secondary party. The dropping may cause sending a notification to the primary party notifying that the secondary party is no longer a party to the at least three-way conversation. Upon the dropping, the method 3900 may proceed with enabling the one or more brand agents to add a further secondary party to the at least three-way conversation.

In an example embodiment, the method 3900 may further include enabling the one or more brand agents to hand off a control to the secondary party. The method 3900 may proceed with enabling the secondary party to send a notice to the primary party on the two-way communication channel that the brand is handing responsibility to the secondary party. The notice may inform that a further two-way communication channel is to be initiated between a phone number associated with the primary party and a phone number provisioned for the secondary party. The method 3900 may proceed with sending a further URL to one or more further secondary parties and to the one or more brand agents inviting them to join the further two-way communication channel.

In an example embodiment, the method 3900 may further include receiving a request, from the one or more brand agents or a further party, for a location of any of the primary party and the secondary parties. Upon receiving of an approval from the primary party or the secondary parties, the method 3900 may proceed with sharing the location by sending a pre-defined templated message by the one or more brand agents or the further party to the primary party or the secondary parties. The pre-defined templated message may include a further URL. The further URL, when clicked, may use location services of a device that the primary party or the secondary parties use to communicate to share, upon the receiving of the approval from the primary party or the secondary parties, the location of the primary party or the secondary parties to enable all the parties to know the location of the primary party or the secondary parties. The sharing of the location may be in a form of a follow-me map continuously updating the location of any of the primary party and the secondary parties to all the parties on the at least three-way conversation.

In an example embodiment, the method 3900 may further include enabling the one or more brand agents and all the secondary parties to conduct separate two-way conversations or multiparty conversations associated with the at least three-way conversation. The two-way conversations and the multiparty conversations may be invisible to the primary party for purposes of coordinating support for the primary party. The two-way conversations and the multiparty conversations may remain associated with the at least three-way conversation with the primary party.

In an example embodiment, the method 3900 may further include the one or more brand agents exporting the at least three-way conversation. The exporting may be performed via one of a copy and paste command, an export to Portable Document Format command, posting to an integrated application, and a further method of transferring conversational data associated with the least three-way conversation and selected prior conversations including annotations and associated side conversations to a further application through a user interface or through an automated action triggered by a content of a message or an action that is internal or external to a system associated with the SDN.

In an example embodiment, the method 3900 may further include sending, in response to detecting a keyword or a message content received from a party having a role, an automatic reply by an automated system. An interpretation of the message content and a synthesis of the automatic reply may be based on one of the following: a lookup, an algorithm, machine learning, a statistical model, a computational method, and so forth. The interpretation may be performed to interpret a natural language of a message in the at least three-way conversation from the party having the role and determine which one of the parties is to respond. In response to the determination of one of the parties to respond, the method 3900 may proceed with synthesizing a response message, inviting a further party and synthesizing a further response message, or taking a predetermined action.

Figure 40:
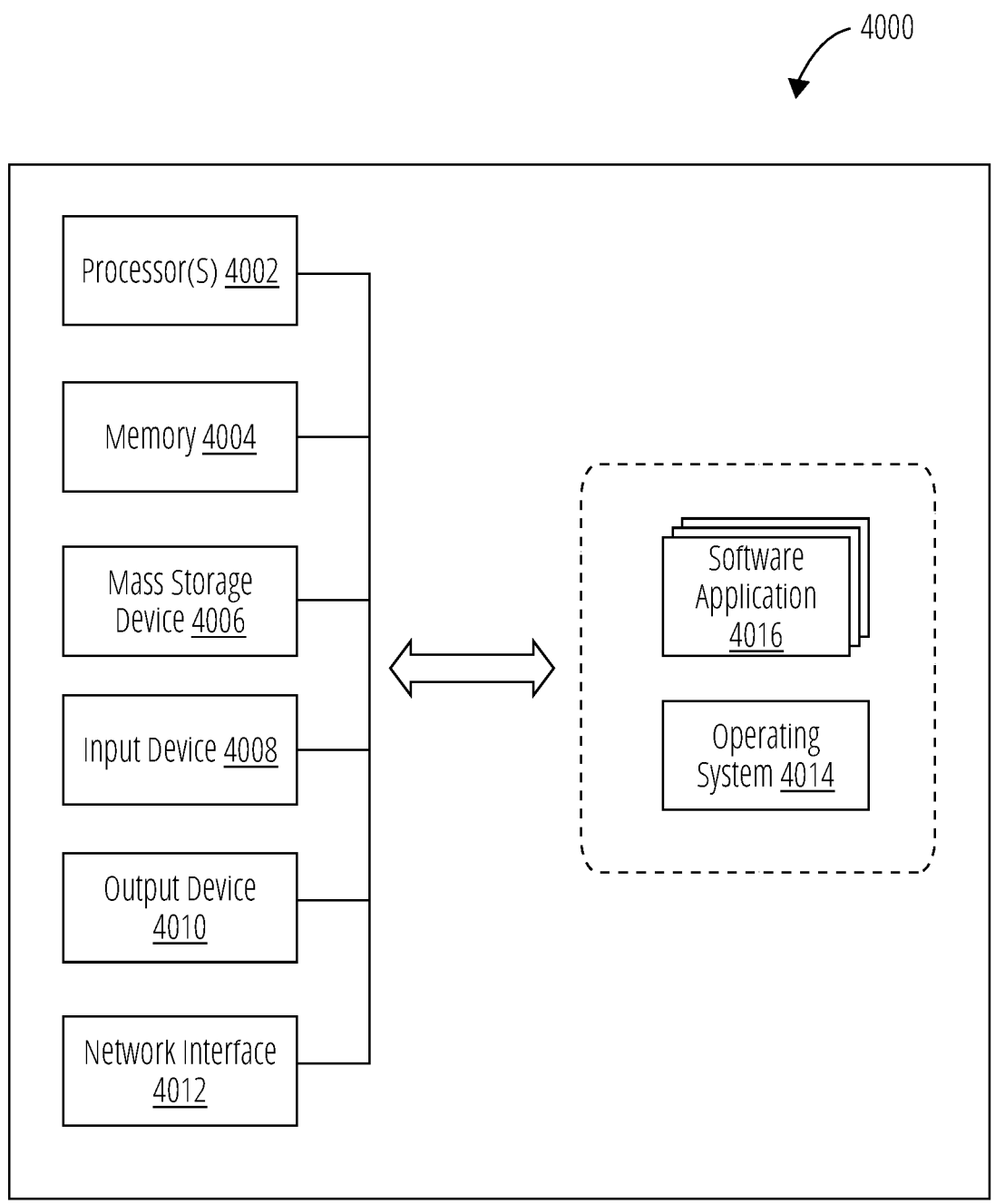
FIG. 40 is a high-level block diagram illustrating an example computer system, within which a set of instructions for causing the machine to perform any one or more of the methodologies discussed herein can be executed.

FIG. 40 is a high-level block diagram illustrating an example computer system 4000, within which a set of instructions for causing the machine to perform any one or more of the methodologies discussed herein can be executed. The computer system 4000 may include, refer to, or be an integral part of, one or more of a variety of types of devices, such as a general-purpose computer, a desktop computer, a laptop computer, a tablet computer, a netbook, a mobile phone, a smartphone, a personal digital computer, a smart television device, and a server, among others. In some embodiments, the computer system 4000 is an example of user devices of customers, user devices of providers, user devices of network representatives of brands, or a system 110 shown in FIG. 2. Notably, FIG. 40 illustrates just one example of the computer system 4000 and, in some embodiments, the computer system 4000 may have fewer elements/modules than shown in FIG. 40 or more elements/modules than shown in FIG. 40.

The computer system 4000 may include one or more processor(s) 4002, a memory 4004, one or more mass storage devices 4006, one or more input devices 4008, one or more output devices 4010, and a network interface 4012. The processor(s) 4002 are, in some examples, configured to implement functionality and/or process instructions for execution within the computer system 4000. For example, the processor(s) 4002 may process instructions stored in the memory 4004 and/or instructions stored on the mass storage devices 4006. Such instructions may include components of an operating system 4014 or software applications 4016. The computer system 4000 may also include one or more additional components not shown in FIG. 40.

The memory 4004, according to one example, is configured to store information within the computer system 4000 during operation. The memory 4004, in some example embodiments, may refer to a non-transitory computer-readable storage medium or a computer-readable storage device. In some examples, the memory 4004 is a temporary memory, meaning that a primary purpose of the memory 4004 may not be long-term storage. The memory 4004 may also refer to a volatile memory, meaning that the memory 4004 does not maintain stored contents when the memory 4004 is not receiving power. Examples of volatile memories include random access memories, dynamic random access memories, static random access memories, and other forms of volatile memories known in the art. In some examples, the memory 4004 is used to store program instructions for execution by the processor(s) 4002. The memory 4004, in one example, is used by software (e.g., the operating system 4014 or the software applications 4016). Generally, the software applications 4016 refer to software applications suitable for implementing at least some operations of the methods for establishing at least three-way conversation between a primary party, secondary parties, and one or more brand agents within a SDN as described herein.

The mass storage devices 4006 may include one or more transitory or non-transitory computer-readable storage media and/or computer-readable storage devices. In some embodiments, the mass storage devices 4006 may be configured to store greater amounts of information than the memory 4004. The mass storage devices 4006 may further be configured for long-term storage of information. In some examples, the mass storage devices 4006 include non-volatile storage elements. Examples of such non-volatile storage elements include magnetic hard discs, optical discs, solid-state discs, flash memories, forms of electrically programmable memories (EPROM) or electrically erasable and programmable memories, and other forms of non-volatile memories known in the art.

The input devices 4008, in some examples, may be configured to receive input from a user through tactile, audio, video, or biometric channels. Examples of the input devices 4008 may include a keyboard, a keypad, a mouse, a trackball, a touchscreen, a touchpad, a microphone, one or more video cameras, image sensors, fingerprint sensors, or any other device capable of detecting an input from a user or other source, and relaying the input to the computer system 4000, or components thereof.

The output devices 4010, in some examples, may be configured to provide output to a user through visual or auditory channels. The output devices 4010 may include a video graphics adapter card, a liquid crystal display monitor, a light emitting diode (LED) monitor, an organic LED monitor, a sound card, a speaker, a lighting device, a LED, a projector, or any other device capable of generating output that may be intelligible to a user. The output devices 4010 may also include a touchscreen, a presence-sensitive display, or other input/output capable displays known in the art.

The network interface 4012 of the computer system 4000, in some example embodiments, can be utilized to communicate with external devices via one or more data networks such as one or more wired, wireless, or optical networks including, for example, the Internet, intranet, LAN, WAN, cellular phone networks, Bluetooth radio, and an IEEE 902.11-based radio frequency network, Wi-Fi Networks®, among others. The network interface 4012 may be a network interface card, such as an Ethernet card, an optical transceiver, a radio frequency transceiver, or any other type of device that can send and receive information.

The operating system 4014 may control one or more functionalities of the computer system 4000 and/or components thereof. For example, the operating system 4014 may interact with the software applications 4016 and may facilitate one or more interactions between the software applications 4016 and components of the computer system 4000. As shown in FIG. 40, the operating system 4014 may interact with or be otherwise coupled to the software applications 4016 and components thereof. In some embodiments, the software applications 4016 may be included in the operating system 4014. In these and other examples, virtual modules, firmware, or software may be part of the software applications 4016.

Thus, systems and methods for establishing at least three-way conversation between a primary party, secondary parties, and one or more brand agents within an SDN have been described. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A method for establishing at least three-way conversation between a primary party, secondary parties, and one or more brand agents within a service delivery network (SDN), the primary party including an individual, the secondary parties including a plurality of further individuals, the method comprising:
    initiating, by a processor, a two-way communication channel between a first communication endpoint associated with the primary party and a second communication endpoint assigned to the one or more brand agents, the one or more brand agents being associated with a brand, the secondary parties being entities independent from the brand;
    upon the initiating the two-way communication channel, receiving, by the processor, from the one or more brand agents, a selection of one or more secondary parties from a database of the secondary parties;
    synthesizing, by the processor, a Uniform Resource Locator (URL) for a secondary party of the one or more secondary parties to join the two-way communication channel;
    providing, by the processor, the URL to a third communication endpoint associated with the secondary party, the third communication endpoint being used by the secondary party to join the two-way communication channel, the third communication endpoint associated with the secondary party being different from the second communication endpoint assigned to the one or more brand agents;
    initiating, by the processor, upon detecting that the secondary party clicked the URL, the at least three-way conversation between the primary party, the secondary party, and the one or more brand agents via the two-way communication channel, wherein the detecting that the secondary party clicked the URL initiates opening of a user interface on a user device associated with the secondary party, the user interface enabling the secondary party to communicate with the primary party, the opening of the user interface includes opening of one of the following:
        an application associated with the SDN and running on the user device of the secondary party, the user interface being associated with the application; and
        a default application for viewing websites running on the user device of the secondary party, the user interface being associated with a website associated with the SDN; and
    upon the initiating the at least three-way conversation, synthesizing, by the processor, messages to be sent between the one or more of the brand, the primary party, and the secondary party in the at least three-way conversation, the synthesizing of the messages being based on the following:
        a pre-defined template;
        metadata associated with one or more of the brand, the primary party, the secondary party, and a service for which the brand, the primary party, and the secondary party are engaged; and
        one or more of the following: a lookup, an algorithm, a machine learning model, a statistical model, and a computational method.

2. The method of claim 1, wherein the primary party communicates with the one or more brand agents and the secondary party via a Short Message Service (SMS) between a phone number of the primary party and a phone number provisioned for the brand, wherein the messages sent by the secondary party to the primary party are received by the brand and resent by the brand from the phone number provisioned for the brand to the phone number of the primary party.

3. The method of claim 1, further comprising, upon the receiving the selection of the one or more secondary parties from the database:
    simultaneously starting a communication channel between the one or more brand agents and each of the one or more secondary parties;

providing, via the communication channel, metadata associated with the primary party to the one or more secondary parties;

receiving a feedback from the one or more secondary parties;

based on the feedback received from the one or more secondary parties, enabling the primary party to inquire for information associated with the one or more secondary parties; and upon providing the information received from the one or more secondary parties to the primary party, enabling the primary party to select the secondary party from the one or more secondary parties.

4. The method of claim 1, further comprising:

receiving, from the primary party, a selection of one or more further secondary parties from the one or more secondary parties;

based on the selection, enabling the brand to provision the further secondary parties with individual phone numbers; and initiating further at least three-way conversations between the primary party, the one or more brand agents, and each of the further secondary parties via the two-way communication channel, wherein the primary party and the further secondary parties communicate via an SMS between a phone number of the primary party and the individual phone numbers provisioned for the further secondary parties.

5. The method of claim 1, wherein the URL is shared by the one or more brand agents with the secondary party via an SMS message sent to the secondary party, the SMS message being synthesized using metadata associated with the primary party and metadata associated with a service, the secondary party being responsible for the service.

6. The method of claim 1, further comprising enabling the one or more brand agents to communicate through the two-way communication channel via a first application, the first application enabling the one or more brand agents to monitor, review, participate in, and manage adding and dropping of parties to the at least three-way conversation between the primary party and the secondary parties, wherein the first application includes one of the following: a standalone application and an application embedded within a second application in use by the one or more brand agents.

7. The method of claim 1, wherein the URL is temporary and expires within a predetermined time to limit the time when the secondary party is enabled to join the at least three-way conversation.

8. The method of claim 1, further comprising labelling the messages sent in the at least three-way conversation with labels to indicate, to the primary party, the secondary party or the one or more brand agents sending the messages, wherein the labels are automatically synthesized based on one or more of metadata associated with the secondary party and metadata associated with the brand.

9. The method of claim 1, further comprising announcing the joining of the secondary party with an announcement message, the announcement message being synthesized based on metadata associated with the secondary party, thereby indicating, to the primary party, that the secondary party is present in the at least three-way conversation.

10. The method of claim 1, further comprising:

enabling the one or more brand agents to drop the secondary party, wherein the dropping causes sending a notification to the primary party notifying that the secondary party is no longer a party to the at least three-way conversation; and upon the dropping, enabling the one or more brand agents to add a further secondary party to the at least three-way conversation.

11. The method of claim 1, further comprising:

enabling the one or more brand agents to hand off a control to the secondary party;

enabling the secondary party to send a notice to the primary party on the two-way communication channel that the brand is handing off the control to the secondary party, the notice notifying that a further two-way communication channel is to be initiated between a phone number associated with the primary party and a phone number provisioned for the secondary party; and sending a further URL to one or more further secondary parties and to the one or more brand agents inviting to join the further two-way communication channel.

12. The method of claim 1, wherein the messages sent in the at least three-way conversation have parameters partially or fully completed before the messages are sent; and wherein the messages are categorized by a role, wherein a party associated with the role is enabled to see the messages associated with the role.

13. The method of claim 1, wherein the initiating the two-way communication channel between the one or more brand agents and the primary party includes sending the messages over an interprocess communication channel, wherein the primary party is enabled to choose to switch the two-way communication channel to an SMS channel or a further channel, and wherein the primary party is enabled to switch back to the interprocess communication channel or the further channel; and wherein a plurality of at least three-way conversations continues after choosing, by the primary party, any of the two-way communication channel, the SMS channel, and the further channel to communicate.

14. The method of claim 1, further comprising:

receiving a request, from the one or more brand agents or a further party, for a location of any of the primary party and the secondary parties; and upon receiving of an approval from the primary party or the secondary parties, sharing the location by sending a pre-defined templated message by the one or more brand agents or the further party, to the primary party or the secondary parties, wherein the pre-defined templated message includes a further URL, wherein the further URL, when being clicked, uses location services of a device that the primary party or the secondary parties uses to communicate to share, upon the receiving of the approval from the primary party or the secondary parties, the location of the primary party or the secondary parties to enable all the parties to know the location of the primary party or the secondary parties;

wherein the sharing of the location is in a form of a follow-me map continuously updating the location of any of the primary party and the secondary parties to all the parties on the at least three-way conversation.

15. The method of claim 1, further comprising enabling the one or more brand agents and the secondary parties to annotate the at least three-way conversation and share notes, the notes being invisible to the primary party.

16. The method of claim 1, further comprising enabling the one or more brand agents and all the secondary parties to conduct separate two-way conversations or multiparty conversations associated with the at least three-way conversation, the two-way conversations and the multiparty conversations being invisible to the primary party for purposes of coordinating support for the primary party, wherein the two-way conversations and the multiparty conversations remain associated with the at least three-way conversation with the primary party.

17. The method of claim 1, further comprising exporting the at least three-way conversation by the one or more brand agents via one of a copy and paste command, an export to Portable Document Format command, posting to an integrated application, and a further method of transferring conversational data associated with the at least three-way conversation and selected prior conversations including annotations and associated side conversations to a further application through a further user interface or through an automated action triggered by a content of a message or an action being internal or external to a system associated with the SDN.

18. The method of claim 1, further comprising sending, in response to detecting a keyword or a message content received from a party having a role, an automatic reply by an automated system, wherein an interpretation of the message content and a synthesis of the automatic reply is based on one of the following: a lookup, an algorithm, machine learning, a statistical model, and a computational method, to:
  interpret a natural language of a message in the at least three-way conversation from the party having the role;
  determine one of the parties is to respond; and
  in response to the determination, perform one of the following:
    synthesize a response message;
    invite a further party and synthesize a further response message; and
    take a predetermined action.

19. A system for establishing at least three-way conversation between a primary party, secondary parties, and one or more brand agents within a service delivery network (SDN), the primary party including an individual, the secondary parties including a plurality of further individuals, the system comprising:
  a processor; and
  a memory storing instructions that, when executed by the processor, configure the processor to:
    initiate a two-way communication channel between a first communication endpoint associated with the primary party and a second communication endpoint assigned to the one or more brand agents, the one or more brand agents being associated with a brand, the secondary parties being entities independent from the brand;
    upon the initiating the two-way communication channel, receive, from the one or more brand agents, a selection of one or more secondary parties from a database of the secondary parties;
    synthesize a Uniform Resource Locator (URL) for a secondary party of the one or more secondary parties to join the two-way communication channel;
    provide the URL to a third communication endpoint associated with the secondary party to join the two-way communication channel, the third communication endpoint associated with the secondary party being different from the second communication endpoint assigned to the one or more brand agents;
    initiate, upon detecting that the secondary party clicked the URL, the at least three-way conversation between the primary party, the secondary party, and the one or more brand agents via the two-way communication channel, wherein the detecting that the secondary party clicked the URL initiates opening of a user interface on a user device associated with the secondary party, the user interface enabling the secondary party to communicate with the primary party, the opening of the user interface includes opening of one of the following:
      an application associated with the SDN and running on the user device of the secondary party, the user interface being associated with the application; and
      a default application for viewing websites running on the user device of the secondary party, the user interface being associated with a website associated with the SDN; and
    upon the initiating the at least three-way conversation, synthesize messages to be sent between the one or more of the brand, the primary party, and the secondary party in the at least three-way conversation, the synthesizing of the messages being based on the following:
      a pre-defined template;
      metadata associated with one or more of the brand, the primary party, the secondary party, and a service for which the brand, the primary party, and the secondary party are engaged; and
      one or more of the following: a lookup, an algorithm, a machine learning model, a statistical model, and a computational method.

20. A system for establishing at least three-way conversation between a primary party, secondary parties, and one or more brand agents within a service delivery network (SDN), the primary party including an individual, the secondary parties including a plurality of further individuals, the system comprising:
  a processor; and
  a memory storing instructions that, when executed by the processor, configure the processor to:
    initiate a two-way communication channel between a first communication endpoint associated with the primary party and a second communication endpoint assigned to the one or more brand agents, the one or more brand agents being associated with a brand, the secondary parties being entities independent from the brand;
    upon the initiating the two-way communication channel, receive, from the one or more brand agents, a selection of one or more secondary parties from a database of the secondary parties;
    synthesize a Uniform Resource Locator (URL) for a secondary party of the one or more secondary parties to join the two-way communication channel;
    provide the URL to a third communication endpoint associated with the secondary party to join the two-way communication channel, the third communication endpoint associated with the secondary party being different from the second communication endpoint assigned to the one or more brand agents;
    initiate, upon detecting that the secondary party clicked the URL, the at least three-way conversation between the primary party, the secondary party, and the one or more brand agents via the two-way communication channel, wherein the detecting that the secondary party clicked the URL initiates opening of a user interface on a user device associated with the secondary party, the user interface enabling the secondary party to communicate with the primary party, the opening of the user interface includes opening of one of the following:
an application associated with the SDN and running on the user device of the secondary party, the user interface being associated with the application; and
a default application for viewing websites running on the user device of the secondary party, the user interface being associated with a website associated with the SDN;
upon the initiating the at least three-way conversation, synthesize messages to be sent between the one or more of the brand, the primary party, and the secondary party in the at least three-way conversation, the synthesizing of the messages being based on the following:
a pre-defined template;
metadata associated with one or more of the brand, the primary party, the secondary party, and a service for which the brand, the primary party, and the secondary party are engaged; and
one or more of the following: a lookup, an algorithm, a machine learning model, a statistical model, and a computational method;

wherein the primary party communicates with the one or more brand agents and the secondary party via a Short Message Service (SMS) between a phone number of the primary party and a phone number provisioned for the brand, wherein the messages sent by the secondary party to the primary party are received by the brand and resent by the brand from the phone number provisioned for the brand to the phone number of the primary party;
receive, from the primary party, a selection of one or more further secondary parties from the one or more secondary parties;
based on the selection, provision, by the brand, the one or more further secondary parties with individual phone numbers; and
initiate further at least three-way conversations between the primary party, the one or more brand agents, and each of the one or more further secondary parties via the two-way communication channel;
wherein the primary party and each of the one or more further secondary parties communicate via the SMS between the phone number of the primary party and the individual phone numbers provisioned for the one or more further secondary parties.

* * * * *